US007707059B2

(12) United States Patent
Reed et al.

(10) Patent No.: US 7,707,059 B2
(45) Date of Patent: Apr. 27, 2010

(54) ADAPTIVE MARKETING USING INSIGHT DRIVEN CUSTOMER INTERACTION

(75) Inventors: Kenneth L. Reed, Mission Viejo, CA (US); Theodore Ansusinha, Plymouth, MN (US); Hari S. Hariharan, Madison, WI (US)

(73) Assignee: Accenture Global Services GmbH (CH)

( * ) Notice: Subject to any disclaimer, the term of this patent is extended or adjusted under 35 U.S.C. 154(b) by 1505 days.

(21) Appl. No.: 10/302,395

(22) Filed: Nov. 22, 2002

(65) Prior Publication Data

US 2004/0103017 A1 May 27, 2004

(51) Int. Cl.
*G06F 17/30* (2006.01)
(52) U.S. Cl. ........................................ 705/10
(58) Field of Classification Search .................. 705/10
See application file for complete search history.

(56) References Cited

U.S. PATENT DOCUMENTS

| | | | |
|---|---|---|---|
| 5,548,506 A | | 8/1996 | Srinivasan |
| 5,659,724 A | | 8/1997 | Borgida et al. |
| 5,712,987 A | * | 1/1998 | Waits et al. ............... 705/36 R |
| 5,806,062 A | | 9/1998 | Chen et al. |
| 5,930,764 A | | 7/1999 | Melchione et al. |
| 5,963,910 A | * | 10/1999 | Ulwick .......................... 705/7 |
| 5,987,466 A | | 11/1999 | Greer et al. |
| 6,026,397 A | | 2/2000 | Sheppard |
| 6,032,125 A | * | 2/2000 | Ando ........................... 705/10 |
| 6,064,977 A | | 5/2000 | Haverstock et al. |

(Continued)

FOREIGN PATENT DOCUMENTS

JP 2002-140490 5/2002

(Continued)

OTHER PUBLICATIONS

Cabena, Peter; Choi, Hyun Hee; Kim, Il Soo; Otsuka, Shuichi; Reinschmidt, Joerg; Saarenvirta, Gary. "Intelligent Miner for Data Applications Guide". Mar. 1999. IBM Corporation.*

(Continued)

*Primary Examiner*—Jonathan G Sterrett
*Assistant Examiner*—Peter Choi
(74) *Attorney, Agent, or Firm*—Finnegan, Henderson, Farabow, Garrett & Dunner, LLP

(57) ABSTRACT

A system and method for adaptive marketing using insight driven customer interaction. The invention uses a closed-loop process for developing insight that may be used to refine further customer interactions. Results of a first customer interaction such as a marketing campaign are stored in a database. The results may be used to retrain predictive models and gain new insights regarding how customers are responding to marketing campaigns. The insights may be used to refine the offers delivered to customers or to extend additional offers in an effort to increase the likelihood that customers will redeem the offers. After each marketing campaign, the results are stored in the database. New and/or modified offers are created based on insights provided by the results of past campaigns. This process may be repeated such that subsequent campaigns are based on insights generated by the predictive models. The insight enables businesses to better target customers with better offers. These offers can be delivered through ensuing marketing campaigns or, through any form of interaction that the business has with the targeted customers.

66 Claims, 13 Drawing Sheets

U.S. PATENT DOCUMENTS

| | | | |
|---|---|---|---|
| 6,073,112 A * | 6/2000 | Geerlings | 705/14 |
| 6,219,680 B1 | 4/2001 | Bernardo et al. | |
| 6,223,177 B1 | 4/2001 | Tatham et al. | |
| 6,240,441 B1 | 5/2001 | Beckett et al. | |
| 6,240,444 B1 | 5/2001 | Fin et al. | |
| 6,253,234 B1 | 6/2001 | Hunt et al. | |
| 6,334,110 B1 | 12/2001 | Walter et al. | |
| 6,430,539 B1 * | 8/2002 | Lazarus et al. | 705/10 |
| 6,622,125 B1 * | 9/2003 | Cragun et al. | 705/14 |
| 6,636,862 B2 | 10/2003 | Lundahl et al. | |
| 6,647,269 B2 * | 11/2003 | Hendrey et al. | 455/456.3 |
| 6,732,096 B1 | 5/2004 | Au | |
| 6,742,003 B2 | 5/2004 | Heckerman et al. | |
| 6,836,773 B2 * | 12/2004 | Tamayo et al. | 707/6 |
| 6,839,682 B1 * | 1/2005 | Blume et al. | 705/10 |
| 6,862,574 B1 * | 3/2005 | Srikant et al. | 705/10 |
| 6,970,882 B2 | 11/2005 | Yao et al. | |
| 7,003,476 B1 | 2/2006 | Samra et al. | |
| 7,016,936 B2 * | 3/2006 | Wilkinson et al. | 709/205 |
| 7,047,251 B2 | 5/2006 | Reed et al. | |
| 7,069,197 B1 | 6/2006 | Saidane | |
| 7,072,841 B1 * | 7/2006 | Pednault | 705/4 |
| 7,072,848 B2 | 7/2006 | Boyd et al. | |
| 7,155,401 B1 * | 12/2006 | Cragun et al. | 705/10 |
| 7,177,851 B2 * | 2/2007 | Afeyan et al. | 706/13 |
| 2001/0037321 A1 * | 11/2001 | Fishman et al. | 705/500 |
| 2002/0038230 A1 | 3/2002 | Chen | |
| 2002/0147599 A1 * | 10/2002 | Vishnubhotla | 705/1 |
| 2002/0169658 A1 * | 11/2002 | Adler | 705/10 |
| 2002/0194050 A1 * | 12/2002 | Nabe et al. | 705/10 |
| 2003/0009536 A1 | 1/2003 | Henderson et al. | |
| 2003/0033194 A1 * | 2/2003 | Ferguson et al. | 705/10 |
| 2003/0130899 A1 * | 7/2003 | Ferguson et al. | 705/26 |
| 2003/0163343 A1 * | 8/2003 | Meiser et al. | 705/1 |
| 2003/0195889 A1 | 10/2003 | Yao et al. | |
| 2004/0039679 A1 * | 2/2004 | Norton et al. | 705/37 |
| 2004/0254860 A1 | 12/2004 | Wagner et al. | |
| 2006/0090171 A1 | 4/2006 | Laborczfalvi et al. | |

FOREIGN PATENT DOCUMENTS

| | | |
|---|---|---|
| WO | WO 99/54828 | 10/1999 |

OTHER PUBLICATIONS

Frawley, Andrew; Thearling, Kurt. "Increasing Customer Value by Integrating Data Mining and Campaign Management Software". Feb. 1999. Direct Marketing. vol. 61, Issue 10. pp. 49-53.*

Miglautsch, John R. "Thoughts on RFM Scoring". May 22, 2000. Journal of Database Marketing. vol. 8, Issue 1. pp. 67-72.*

Hoekstra, Janny C.; Huizingh, Eelko K.R.E; "The Lifetime Value Concept in Customer-Based Marketing". 1999. Journal of Market Focused Management. vol. 3, pp. 257-274.*

Schmid, Jack; Boyle, Lois. "Catalog Creative; The RFMP Way". Jul. 1998. Target Marketing. vol. 21, Issue 7. pp. 38-41.*

Weber, Alan. "A Simple Way to Use RFM". Mar. 1997. Target Marketing. vol. 20, Issue 3. pp. 72-75.*

Hughest, Arthur Middleton. "Boosting Response with RFM". May 1996. American Demographics. pp. 4-10.*

Kahan, Ron. "Using Database Marketing Techniques to Enhance Your One-to-One Marketing Initiatives". 1998. The Journal of Consumer Marketing. vol. 15, Issue 5. p. 491.*

Berson, Alex; Smith, Stephen; Thearling, Kurt. "Building Data Mining Applications for CRM". Dec. 22, 1999. McGraw-Hill Companies. Chapter 10. retrieved online from <http://www.thearling.com/text/chapter10.htm>.*

Thearling, Kurt. "Campaign Optimization: Maximing the value of Interacting wwith Your Customers". Aug. 2001. Relationship marketing Report.*

*Dayco* Statement Regarding Related Applications.

(no authors) E.piphany, Inc. Software for the Customer Economy, May 18, 2001, www.epiphany.com, pp. 1-7.

(no authors) Is your dimensional data warehousing expressive? Intelligent enterprise, www.intelligententerprise.com, May 15, 2000 vol. 3—number, pp. 1-4.

(no authors) MarketFirst to Integrate Leading Analytic Applications from Business Objects, May 15, 2002, www.businessobjects.com Partners Press Release, pp. 1.

(no authors) RightNow Technologies and MarketFirst Partnership Delivers Complete e-Marketing solutions, Aug. 14, 2001, www.rightnow.com, pp. 1-2.

Andrew Eisenberg et al., SQL standardization: the next steps, Mar. 2000, vol. 29, Issue 1, pp. 63-67.

Machauer and Morgner,Segmentation of bank customers by expected benefits and attitudes, international journal of Bank Marketing, 19/1 (2001), p. 6-17.

Office Action issued on Aug. 10, 2007 by US PTO on U.S. Appl. No. 10/302,418.

Office Action/Examination Report issued by the EPO Nov. 6, 2007 on Application No. 03 812 082.0-2221.

Office Action issued on Mar. 3, 2008 by US PTO on U.S. Appl. No. 10/302,418.

AU Examination Report issued on Mar. 15, 2007 for AU Application No. 2003302762.

AU Examination Report issued on Oct. 1, 2008 for AU Application No. 2003302762.

Becher, Tutorial on E-Commerce and Clickstream Mining, First SIAM International Conference on Data Mining, Apr. 5, 2001, p. 1-84.

Berson et al. "Customer Acquisition and Data Mining," Excerpted from the Book Building Data Mining Applications for CRM 1999, online reprint comprises p. 1-6.

CRM Best Practices, CRMTRends.com, Oct. 16, 2002, p. 1-11, retrieved from web.archive.org, http://www.web.archive.org/web/20021016232814/ http://crmtrends.com/analytics.html.

Eick, "Visual Discovery and Analysis," IEEE Transactions on Visualization and Computer Graphics, vol. 6, No. 1 Jan.-Mar. 2000, p. 44-58.

Gray et al. "Data Cube: A Relational Aggregation Operator Generalizing Group-By, Cross-Tab, and Sub-Totals," Data Mining and Knowledge Discovery 1, 1997, p. 29-53.

Hahn et al. "Capturing Customer Heterogeneity Using a Finite Mixture PLS Approach," Schmalenbach Review, vol. 54, Jul. 2002, p. 243-269.

Morgan, "The Boomer Attitude," American Demographics, Oct. 1, 2002, p. 1-5.

Poulos, "Choosing Customers Through Needs-Based Segmentation: Part I," destinationCRM.com, Nov. 8, 2000, p. 1-3.

Vassiliadis, "Modeling Multidimensional Databases, Cubes, and Cube Operations," IEEE 1998, p. 53-62.

Yankelovich—Solutions and Services, Yankelovich Monitor MindBase, 2001-2002, p. 1-22, retrieved from web.archive.org, see e.g., http://web.archive.org/20011024020908/secure.yankelovich.com/solutions/mindbase.asp.

AdAgent 2.0, Ad Sales Go Real-Time, Karpinski, Richard, InternetWeek, v692, p. 19(1), Dec. 1, 1997, 3 pages.

AU Examination Report issued on Apr. 20, 2007 for AU Application No. 2003302353.

AU Examination Report issued on Apr. 5, 2007 for AU Application No. 2003299439.

AU Examination Report issued on Apr. 8, 2008 for AU Application No. 2003299439.

AU Examination Report issued on Jun. 27, 2008 for AU Application No. 2003302353.

EP Communication issued on Nov. 8, 2007 for EP Application No. 02784170.9.

EP Examination Report issued on Feb. 29, 2008 for EP Application No. 03811852.7.

Frawley et al., "Increasing Customer Value by Integrating Data Mining and Campaign Management Software," Direct Marketing 61(10):49-53 (1999).

Hoekstra et al., "The Lifetime Value Concept in Customer-Based Marketing," Journal of Market Focused Management 3:257-274 (1999).

Hughes, Arthur Middleton, "Boosting Response with RFM," American Demographics, pp. 4-10 (May 1996).

IN Examination Report issued on Jan. 2, 2006 for IN Application No. 2612/DELNP/2005.

IN Examination Report issued on Oct. 19, 2007 for IN Application No. 2590/DELNP/2005.

IN Examination Report issued on Dec. 27, 2006 for IN Application No. 2612/DELNP/2005.

IN Examination Report issued on Feb. 28, 2007 for IN Application No. 2590/DELNP/2005.

Information regarding Enterprise Insight downloaded from www.epihany.com, May 18, 2001, 7 pages.

Information regarding nQuire Software downloaded from www.nQuire.com, Jul. 23, 2001, 12 pages.

Kahan, Ron, "Using database marketing techniques to enhance your one-to-one marketing initiatives," The Journal of Consumer Marketing 15(5):491 (1998).

MarketFirst Announces Initial Customer Availability of MarketFirst Release 2.0. PR Newswire, p. 2526, May 4, 1999, 4 pages.

Miglautsch, John R., "Thoughts on RFM scoring," Journal of Database Marketing 8(1):67-72 (2000).

Office Action issued on Apr. 15, 2003 by USPTO in U.S. Appl. No. 10/014,840.

Office Action issued on Nov. 12, 2003 by USPTO in U.S. Appl. No. 10/014,840.

Office Action issued on Mar. 8, 2005 by USPTO in U.S. Appl. No. 10/302,337.

Office Action issued on Aug. 21, 2008 by USPTO in U.S. Appl. No. 10/302,418.

Office Action issued on Apr. 27, 2009 by USPTO in U.S. Appl. No. 10/302,418.

Office Action issued on May 2, 2006 by USPTO in U.S. Appl. No. 11/147,034.

Office Action issued on Oct. 19, 2006 by USPTO in U.S. Appl. No. 11/147,034.

Paragren Technologies and Rubric Announce Strategic Relationship: web execution and workflow enhances relationship marketing solutions. PR Newswire, p073DCTH030, Jul. 30, 1998, 3 pages.

Schmid et al., "Catalog Creative: The RFMP Way," Target Marketing 21(7):38-41 (1998).

Thearling, Kurt, "Campaign Optimization: Maximizing the Value of Interacting with Your Customers," Relationship Marketing Report, Aug. 2001.

Weber, Alan, "A Simple Way to Use RFM," Target Marketing 20(3):72-75 (1997).

* cited by examiner

| | SEGMENT 1 | SEGMENT 2 | SEGMENT 3 | SEGMENT 4 | SEGMENT 5 | SEGMENT 6 |
|---|---|---|---|---|---|---|
| SEGMENT NAME | MORTGAGE OWNERS | BIG SAVERS | SMALL SAVERS | NORMAL SAVERS | NEW CUSTOMERS | NEW ENTRENCHED CUSTOMERS |
| DESCRIPTION | HIGH BALANCE MORTGAGES | HIGH BALANCES IN CHECKING AND SAVINGS | SMALL BALANCES IN CHECKING AND SAVINGS | CHECKING AND SAVINGS ACCOUNTS | ONLY CHECKING ACCOUNT WITH LOW BALANCE | OWNS THE MOST PRODUCTS BANK CREDIT CARDS |
| % OF SAMPLE POPULATION | 30 | 8 | 4 | 17 | 25 | 16 |
| LIFT | 0.3 | 2.8 | 1.1 | 1.3 | 0.7 | 2.2 |
| ASSET ACCOUNT | FEW ACCOUNTS | LOW BALANCES | HIGH CHECKING AND SAVINGS BALANCES | HIGH CHECKING AND SAVINGS BALANCES | AVERAGE BALANCES FEW ACCOUNTS LOW BALANCES | HIGH CHECKING, SAVINGS AND CD BALANCES |
| LOAN ACCOUNTS | HIGH MORTGAGE BALANCES | FEW LOAN ACCOUNTS LOW MORTGAGE BALANCES | LOWEST LOAN BALANCES NO MORTGAGES | FEW LOAN ACCOUNTS WITH LOW BALANCES | HIGH MORTGAGE LOAN BALANCES | HIGH MORTGAGE BALANCES |
| TENURE | 5 YEARS | 10 YEARS | 10 YEARS | 8 YEARS | 6 YEARS | 13 YEARS |
| TRANSACTION ACTIVITY | LOWEST | HIGH NUMBER OF DEPOSITS ONLY | HIGH NUMBER OF TRANSACTIONS | AVERAGE | AVERAGE | HIGH NUMBER OF TRANSACTIONS |
| DEMOGRAPHICS | HIGHER HOME OWNERSHIP RATES | HIGHER AVERAGE INCOME RATES | LOWER AVERAGE INCOME RATES | HIGHER HOME OWNERSHIP RATES AVERAGE DEMOGRAPHICS | LOWER HOME OWNERSHIP RATES | HIGHER AVERAGE INCOME RATES |

FIG. 1B

| TARGETS | DESCRIPTION | HYPOTHESES | POTENTIAL OFFERS |
|---|---|---|---|
| SEGMENT 6- ENTRENCHED CUSTOMERS | HAVE VERY HIGH $ ASSETS<br>OWN THE MOST BANK PRODUCTS<br>HAVE A MORTGAGE LOAN<br>CONSERVATIVE, LONG TERM INVESTORS<br>LONGEST BANK RELATIONSHIP | VALUE INVESTING ADVICE FROM TRUSTED SOURCE<br>VALUE INTEGRATED PRODUCT OFFERING FROM THE BANK | FREE SUBSCRIPTION TO INVESTING PUBLICATION<br>BUNDLED PRODUCT OFFERING- BANKING AND BROKERAGE |
| SEGMENT 2- BIG SAVERS | HAVE HIGH $ ASSETS IN SAVINGS AND CHECKING<br>ACTIVE TRADERS<br>MOSTLY DEBT FREE | VALUE FREE TRADES AS A FORM OF CURRENCY<br>VALUE INVESTING ADVICE TO MAKE SMARTER INVESTMENTS | FREE TRADES<br>FREE SUBSCRIPTION TO INVESTING PUBLICATION |

FIG. 1C

ADAPTIVE MARKETING USING INSIGHT DRIVEN CUSTOMER INTERACTION

RELATED APPLICATIONS

This application is related to commonly assigned U.S. Pat. No. 7,047,251, issued May 16, 2006, and titled "Standardized Customer Application And Record For Inputting Customer Data Into Analytic Models", and U.S. patent application Ser. No. 10/302,418, titled "Multi-Dimensional Segmentation For Use In A Customer Interaction", both filed Nov. 22, 2002, all of which are incorporated herein by reference. This application is also related to commonly assigned co-pending U.S. patent application Ser. No. 10/014,840, filed Oct. 22, 2001, and titled "Real-Time Collaboration and Workflow Management for a Marketing Campaign," which is incorporated herein by reference.

FIELD OF THE INVENTION

The invention relates to adaptive marketing, and more particularly to adaptive marketing using insight driven customer interaction.

BACKGROUND OF THE INVENTION

Many businesses use a campaign process to deliver marketing offers to a variety of consumers. The campaign process may be, for example, by telephone or by mass mailing. In order to define the campaigns to execute, the business may gather and aggregate information about their customers from a variety of data sources, both from within their company as well as from third party data providers. After gathering the consumer information, the businesses may decide to separate customers into groupings, customer segments, which have similar characteristics. The businesses may then create a specific list of consumers that the businesses hope will respond positively to the campaign. Sometimes, these lists may be produced using generalized marketing response models—models developed on generalities about the firm's customers rather than specifics about likely customer response to forthcoming campaign offers. These general models are sub-optimal. But more often, the lists are purchased from third-party vendors, or extracted from internal databases using SQL-based rules. Not infrequently, telemarketing relies simply on lists of bare telephone numbers selected from particular area codes and exchanges, with no information about the prospect until the contact is actually established.

This process typically can be time consuming and deliver sub-optimal results. Businesses typically employ personnel to search for the consumer information. The personnel may individually search a number of disparate databases attempting to gather the consumer information. This could include information that helps to identify the customer (e.g., name, address, phone, electronic mail address, etc.), information on products or services the customer has purchased in the past, and any additional contextual information captured during past contacts with the customer. Oftentimes, this information is stored in disparate databases in inconsistent formats, making it very difficult to formulate a total, integrated view of a customer. The databases may also contain stale data that produces poor or even erroneous results.

Businesses may attempt to purchase additional information about existing or prospective customers from third party data providers (e.g., Equifax, etc.). Types of information purchased may include demographic data (e.g., income level, house size), lifestyle data (e.g., activities the customer participates in, etc.), and interests (e.g., information indicating the customer enjoys eating at restaurants, going to see movies, etc.). Oftentimes, businesses find it challenging to integrate externally purchased data with their own customer data. When data is merged from multiple data sources, sophisticated programming skills are required to link records as well as to aggregate information and calculate values that could be useful to predict customer behavior. Further, the extraction of data from multiple sources to drive analytical modeling can be a very laborious, time consuming process given the number of joins that have to be written. Oftentimes, businesses do not have common extract procedures meaning that new extract routines have to be written each time a new form of data analysis needs to be performed.

More advanced database marketers make heavy use of analytics and modeling. Customer segmentations based on commercially available demographics, lifestyle, and life-stage data are often used to help define campaigns. These data are also used to target individuals. Unfortunately, because these data are usually compiled at the zip code or census-tract level, application to individuals for targeting is subject to a great deal of error. Propensity models (models comparing attributes of prospect lists to attributes of existing customers) are often developed by businesses and used to develop targeting lists of persons who look like existing customers, hence may have a greater propensity to respond to the business' marketing campaigns. Some more sophisticated businesses are able to develop response models (models based on respondents to actual campaigns); these models tend to outperform the other list generating methods. However, these more sophisticated models require more sophisticated methods and better data. The cost of developing these models can be high.

For example, a typical model development process may require two or three people and four to twelve weeks (i.e., 12-36 people-weeks) to extract the required customer data and build an analytic model. Then developing a scoring algorithm may take a person four additional weeks. Thus, targeting models are costly. The cost and time required for model development encourages the development of generalized marketing models that are often used for a year or more. Generalized models are commonly outperformed by as much as one hundred percent (100%) by models developed specifically for a particular campaign or offer. Over time, models degrade in performance, but are often used long after their performance peak. This results in diminished marketing returns and often results in abandonment of the use of models for targeting. A second problem is that the data used to create the predictive models and ultimately define and execute the marketing campaigns is old by the time the models are run, leading to out of date model results and poor offer acceptance rates for the resulting marketing campaigns.

The time-consuming conventional modeling and marketing processes cannot support rapid test and learn iterations that could ultimately improve offer acceptance rates. After completing a marketing campaign, the personnel may gather the results of the campaign to determine a success rate for the campaign. The results, however, are typically not effectively fed back into the customer information database and used to reanalyze predictive customer behavior. Without an effective closed-loop, businesses lose the ability to retrain their analytical models and improve their campaigns by defining campaigns that have a greater return.

The effect of the previously described issues extend beyond marketing campaigns to all forms of interaction. A business' inability to execute an effective, closed loop process to tailor their marketing campaigns affects all forms of customer interaction. Ideally, a business should strive to deliver the right message to the right customer through the best channel. Customers who are the target of an outbound marketing campaign should be able to receive the same offer should they interact with the business through any interaction channel (e.g., web, phone, retail branch, etc.) to perform a service transaction, sales transaction, etc. However, since traditional methods prevent the business from quickly generating reliable, targeted offers for customers based upon predictive analytical models and refined through rapid test and learn iterations, they are unable to deliver optimized marketing offers tailored to their customers and prospects across all forms of customer interaction; best offer to the right customer through the best channel.

SUMMARY OF THE INVENTION

The invention relates to a system and method for adaptive marketing using insight driven customer interaction. The invention uses a closed-loop process for developing insight that may be used to refine further customer interactions. Results of a first customer interaction such as a marketing campaign are stored in a database. The results may be used to retrain predictive models and gain new insights regarding how customers are responding to offers delivered in marketing campaigns. The insights may be used to refine the offers delivered to customers or to extend additional offers in an effort to increase the likelihood that customers will redeem the offers. After each marketing campaign, the results are stored in the database. New and/or modified offers are created based on insights provided by the results of past campaigns. Adaptive response models are developed to further refine the targeting list to those persons more likely to respond to the new offers. This process may be repeated such that subsequent campaigns are based on insights generated by the predictive models. The insight enables businesses to better target customers with better offers. These offers can be delivered through ensuing marketing campaigns or, through any form of interaction that the business has with the targeted customers.

In one embodiment, a database is created that stores customer data for a plurality of customers. A Customer Analytic Record ("CAR") application is developed as a database object to be used to extract, transform, and format the customer data needed for all subsequent customer segmentation and predictive modeling. The CAR allows extraction of customer data using predetermined transformations, including custom transformations of the underlying behavioral data. These transforms create new variables derived dynamically by the CAR application. These derived variables are useful in generating new insights into customer behavior. The CAR provides a database object that can be queried like any database table. It is a set of database "views" defined in native SQL that provides a standard format for all data retrieved from the database for analytic modeling and analysis. The CAR is a dynamic view of the customer record that changes whenever any update is made to the database. The CAR enforces standardized, best-practice data transformations of customer data, and reduces errors and omissions that typically plague modeling activities. The definition of the CAR provides complete documentation of each data element available for use in models and analytics, including the transformations. The customer information is formatted into a standard CAR for each customer (referred to as a Prospect Analytic Record ("PAR") when the customers involved are not current customers of the company). Although CAR/PAR refer to different record types, for simplicity, the discussion is directed to CAR even though the invention is also applicable to PAR. Essentially the CAR is a virtual "flat" record of data available for customer analytics, while the PAR is a virtual "flat" record of data available for prospects (usually commercial marketing data). The CAR record usually contains the PAR record plus records formed from customer data.

The information provided by the CAR may be used to segment customers according to a plurality of characteristics. The customers may be categorized into a segment of customers having similar characteristics. The segments may be used to classify customers according to a likelihood of the customers accepting a particular marketing offer. A multi-dimensional segmentation approach may be applied to cross-segment a plurality of customers so that the crossed segments can be profiled for more precise targeting. The segment of customers having the highest ratings may be selected for whom a proposed marketing offer may be modeled. A predictive model may be generated to predict the behavior of a targeted segment. The analysis may assign propensity scores to each customer in targeted segments so that specific customers can be selected to receive offers delivered through marketing campaigns.

As the marketing campaign is executed, the results of the marketing campaign may be captured. The results may indicate the success of the marketing campaign and may include additional metrics useful in understanding the dynamics of the campaign. The results may be used to refine further marketing campaigns. The database storing the customer data may be updated with results corresponding to each customer response. This provides further insight regarding what types of offers a customer responds to, which customers are more likely to respond, etc. This feedback may then be used to execute additional predictive analytic models for refining existing marketing campaigns or generating new marketing campaigns.

BRIEF DESCRIPTION OF THE DRAWINGS

FIG. 1B is a table illustrating segmented customer data according to one embodiment of the invention.

FIG. 1C is a table illustrating the definition of a marketing campaign according to one embodiment of the invention.

DETAILED DESCRIPTION OF THE PREFERRED EMBODIMENTS

Figure 1A:
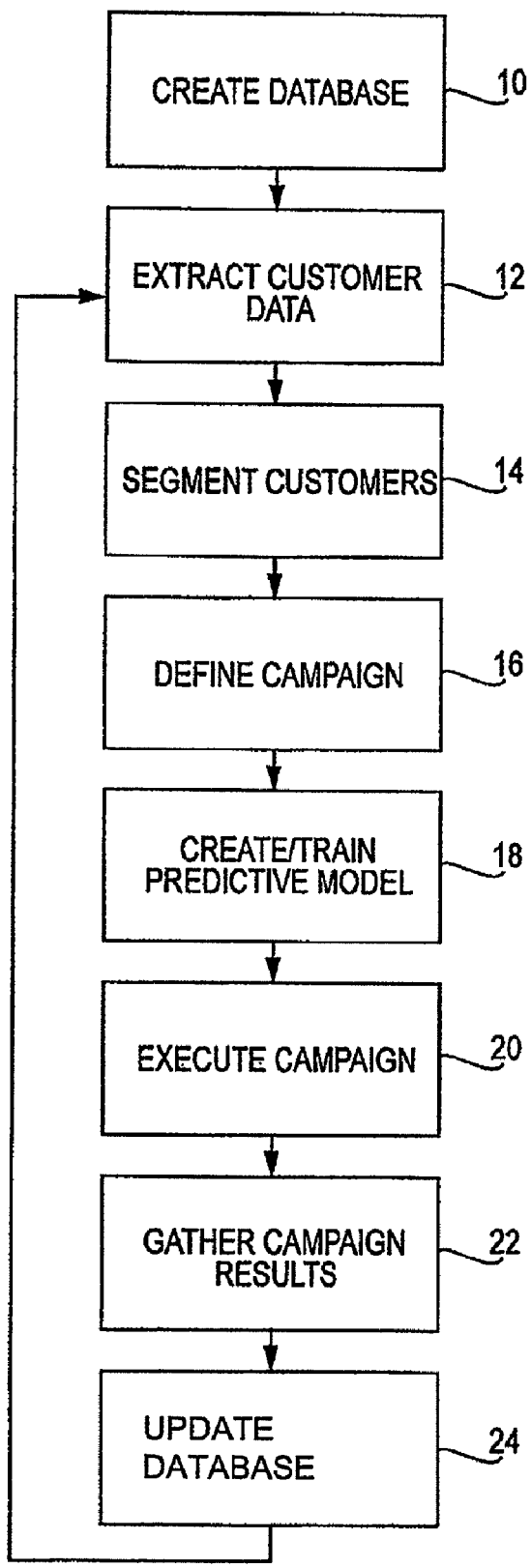
FIG. 1A is a block diagram of a method for adaptive marketing using insight driven customer interaction according to one embodiment of the invention.

The invention relates to adaptive marketing using insight driven customer interaction. The invention can be extended to other customer interactions in which insight improves the interaction between an enterprise and its customers. FIG. 1A illustrates a method for adaptive marketing using insight driven customer interaction according to one embodiment of the invention. Initially, a database may be created to store customer data, step 10. The customer data may be collected through internal, external, and/or business partner data sources. The database used for storing customer data may be any known data storage mechanism, generally a relational database often referred to as a data warehouse. According to one embodiment of the invention, the data warehouse platform used for storing the customer data is powered by NCR's Teradata system.

The data may be extracted from the database, step 12. In one embodiment, a CAR/PAR application may be used to extract data from the database and then transform, aggregate, and combine the data into standardized virtual flat file records for each customer, such as a customer analytic record (CAR) for existing customers and a Prospect Analytic Record (PAR) when the targeted consumers are not current customers of the company. The step of transforming the data may include custom transformations to fill the calculated CAR fields. The CAR may be used as input to descriptive and predictive models to determine how consumers are likely to respond to marketing offers. The models may also be used to predict a likelihood of attrition or other behaviors.

According to one embodiment of the invention, the CAR may be produced via a view. A database view is a virtual query. The CAR is usually written as a set of views that do all the "flattening out" of the data and also computes the ratios, etc. that may be used in modeling. Consider the following SQL statement:

```
select    cust_id,
          acct_balance_RTM,
          max( account_balance)
from      txn_table
where     behavior_segment = 1
and       acct_balance_RIM < 1
order by  cust_id;
```

This statement may be executed by a database system to return a sorted list of customer ids, account balance ratio-to-mean and their maximum account balances. The result may be a table if left in the database or a flat file if exported. The query may be changed to generate a view using, for example, the following:

```
create   view CAR_rtmmax_balance as
select   cust_id,
         acct_balance_RTM,
         max( account_balance)
from     txn_table
```

This creates a virtual table or "view" in the database. The CAR prefix indicates that the view CAR_rtmmax_balance is a component of the overall CAR application. A user may now query CAR_rtmmax_balance as though this component was a table in the database:

select * from CAR_rtmmax_balance where behavior_segment=1 and acct_balance_RTM<1

The view looks just like a table to the user. Because CAR_rtmmax_balance is a view, a query automatically returns the latest values that have been loaded into the database. If the information in the view was stored in a permanent database table (of the same or different name), a special update process would be necessary in order to capture changes made to a base table, txn_table. The optimal configuration for the CAR development is to define is a set of dynamic views of the customer data within the data warehouse. This enhances data integrity in the resulting analytic data set.

The CAR/PAR data may include identification and behavior fields. The identification fields may be for household information such as a household identifier, address, and phone number and household individual information such as name and electronic mail address. The behavior fields summarize transaction information and contain statistical transformation of this data for analytical use. Examples include account summary data, ratio to mean and z-score calculations, moving average and moving difference calculations over a specified period of time, log transformations and slope calculations.

The CAR may also include demographic fields The demographic fields may include, for example, income level and house size. The demographic fields also include fields pertaining to lifestyle and interest. The lifestyle fields may include, for example, whether the individual is a domestic, enjoys the outdoors such as hiking, biking, camping, walking, running, etc., and whether the individual is athletic or enjoys sports. The interest fields may indicate, for example, whether the individual likes to travel, play video games, drink wine, play sports, watch sports, read, etc. Preferably, each of the fields and data included in the CAR may be cross-referenced to an individual's household. This may be performed by linking a household identifier to an individual's identifier.

The CAR may also include a contact history. The contact history may include information related to promotions offered to a customer, promotions redeemed by the customer, elapsed time for the offer to be redeemed, and telephone calls made or emails sent to the customer by a contact center or received from the customer by a contact center. The contact center may be, for example, an on-line support system, a sales representative center, etc.

The CAR also preferably includes model scores. The model score fields may include an individual identifier such as a primary key, a model primary segment or decile such as segment number or predictive model score decile, and a model score such as a predictive model score or a response model score. The model score may also include a household identifier that may be used to cross-reference a customer to a household.

In addition to identification fields, behavior fields, demographic fields, contact history fields, and model score fields, the CAR also preferably includes fields representing product ownership information. Product ownership includes a complete listing of all of the products and services that a customer has previously purchased from the business. Such product ownership information in the CAR record provides a more complete picture of each customer and may be used in determining which offers to extend to certain customer segments.

Segmentation may be performed based on the data extracted, step 14. The segmentation process may establish customer segments, for example, 6-9 groups of customers that are used to drive the campaign strategy and design. The customer segments may be created based on similar characteristics among a plurality of customers. Segmentation is usually based on a random sample set of customer records extracted through the CAR views. For example, the data extracted from the database may be for approximately thirty (30) million customers. Segmentation, however, may be performed only on a percentage, for example, ten (10) percent, of the customer records. Therefore, segmentation may be performed for three (3) million customer records instead of thirty (30) million. Preferably, the three (3) million customer records are randomly selected, however, any manner of selecting the customer records may be used. Although a fewer number of customer records may be used for segmentation, by using a random sample set of a percentage of customer records, a fairly accurate depiction of the customers may still be obtained. Some technologies enable segmentation of the complete customer record. This may be advantageous for segmentation, however, a good random sample will usually be much easier to handle and can produce statistically valid results.

Once the customer segments have been defined, they are profiled in terms of behavior, value, and possibly demographic, lifestyle and life-stage data. This allows the business users to understand and "name" the segments. If the business user cannot name the segments, then the process is repeated until he can. This ensures that the segments are statistically valid and have meaningful business value. At this time, all of the customer records in the database are updated to reflect the segmentation results. FIG. 1B demonstrates a sample segmentation profile. Segments have been defined as customers having mortgages only, big savers, small savers, normal savers, new customers, and entrenched customers. Each segment is described through a description, percentage of sample population falling within the segment, a lift value, asset accounts, loan accounts, tenure, transaction activity, demographics, etc.

After segmenting the customer records, a marketing campaign may be defined for one or more customer segments based upon what's known about the customers in the segment, step 16. For example, referring to FIG. 1B, the lift value may indicate a likelihood for a customer segment to redeem an offer. The lift value may be calculated by dividing a number of accounts held by a predetermined number of customers divided by the number of customers. The lift value provides a factor that may be used to target specific segments and reduce the total number of customers to whom an offer is to be communicated. A reduction in costs is achieved because fewer telephone calls or mailings are necessary to achieve substantially the same or higher response. For example, if a marketing campaign results in 100 new accounts for a bank out of the 1,000,000 customers contacted with the marketing offer, 0.0001 is the calculated lift. By using adaptive marketing through the present invention, 100 new accounts may be opened by contacting just the 400,000 customers most likely to respond (as determined by the model). In FIG. 1B, because segments 2, and 6 have a high lift value, these segments may be targeted for a marketing campaign. By using adaptive marketing, a 0.0025 lift results, which means that for the same number of sales, 600,000 fewer customers needed to be contacted. Because, each contact has a cost, a reduction of 600,000 contacts in an outbound telemarketing context may save millions of dollars in marketing costs.

Next, a predictive model may be created/trained to determine the specific offers to provide to customers based on the data extracted, step 18. Predictive models may be created when a first marketing campaign is defined. Predictive models are often developed using statistical methods like logistic regression, but data mining technologies like neural nets, decision trees may also be used. FIG. 1C is a table that provides a description, hypotheses, and potential offers for segments 2 and 6. Prescriptive models may be defined and executed to determine which of these offers to provide and which specific customers in each segment should be targeted. After the first campaign is executed, the predictive model may be trained using insight obtained from the first marketing campaign. Such training of analytic models is well known in the art, as are the tools to accomplish the modeling. For example, software developed and sold by KXEN, Inc. (Knowledge Extraction Engines) of San Francisco, Calif. may be used.

After training a predictive analytic model, a marketing campaign for one or more customer segments may be executed, step 20. The marketing campaign may be run by communicating offers to the customers through a customer interaction. The customer interaction may be, for example, a telephone call to the home of a customer or a mailing of an offer to the customer's home.

As the campaign is executed, the results of the campaign may be captured, step 22. It should be noted that the invention reduces marketing campaign cycle times and provides adjustments for competitive positioning in a changing market. The invention achieves this by not requiring an arduous data extraction, transformation, modeling, and scoring process to have to be repeated each time a marketing campaign is desired as discussed above. Marketing cycle times are reduced by simplifying the extraction and transformation of all the customer data elements needed for analytic modeling. The CAR application includes all the necessary logic to extract the data from a database and all of the transformations needed to create additional customer data elements for segmentation and predictive modeling. Pre-built data models can also be re-used or leveraged since the models all rely on the same standard data inputs. The invention uses insight developed from prior campaigns to update a customer database.

The results may include, for example, the number of offers redeemed, which customers redeemed the offer, the time elapsed between the offer presentation and redeeming of the offer, and other information. The database may then be updated automatically with the results of the marketing campaign, step 24. This update may be done via a series of SQL update statements, for example. The marketing campaign results provide insight regarding a customer's behavior toward redeeming offers. The insight may be, for example, what types of offers a customer is likely to accept, which customers are more inclined to accept an offer, how quickly a customer redeems an offer, etc. This information may be used to refine further customer interactions to increase the number of offers accepted. Thus, through the interaction with the customer, insight (knowledge) is gained that is used to improve future interactions, such as marketing campaigns. This may be performed by repeating the steps of the method for adaptive marketing using insight driven customer interaction. Based on new customer data extracted (including part or all of the updated data that is the insight gained from the prior interaction), the predictive model may be trained resulting in a more accurate picture of anticipated customer responses to marketing offers. The adaptive model is usually developed to support each new campaign. Due to the rapidity of model development, enabled by this process, models can be developed to support each new campaign, then re-trained (adapted) to provide a mid-campaign correction if necessary. This process may be repeated for any desired number of customer interactions.

Figure 2:
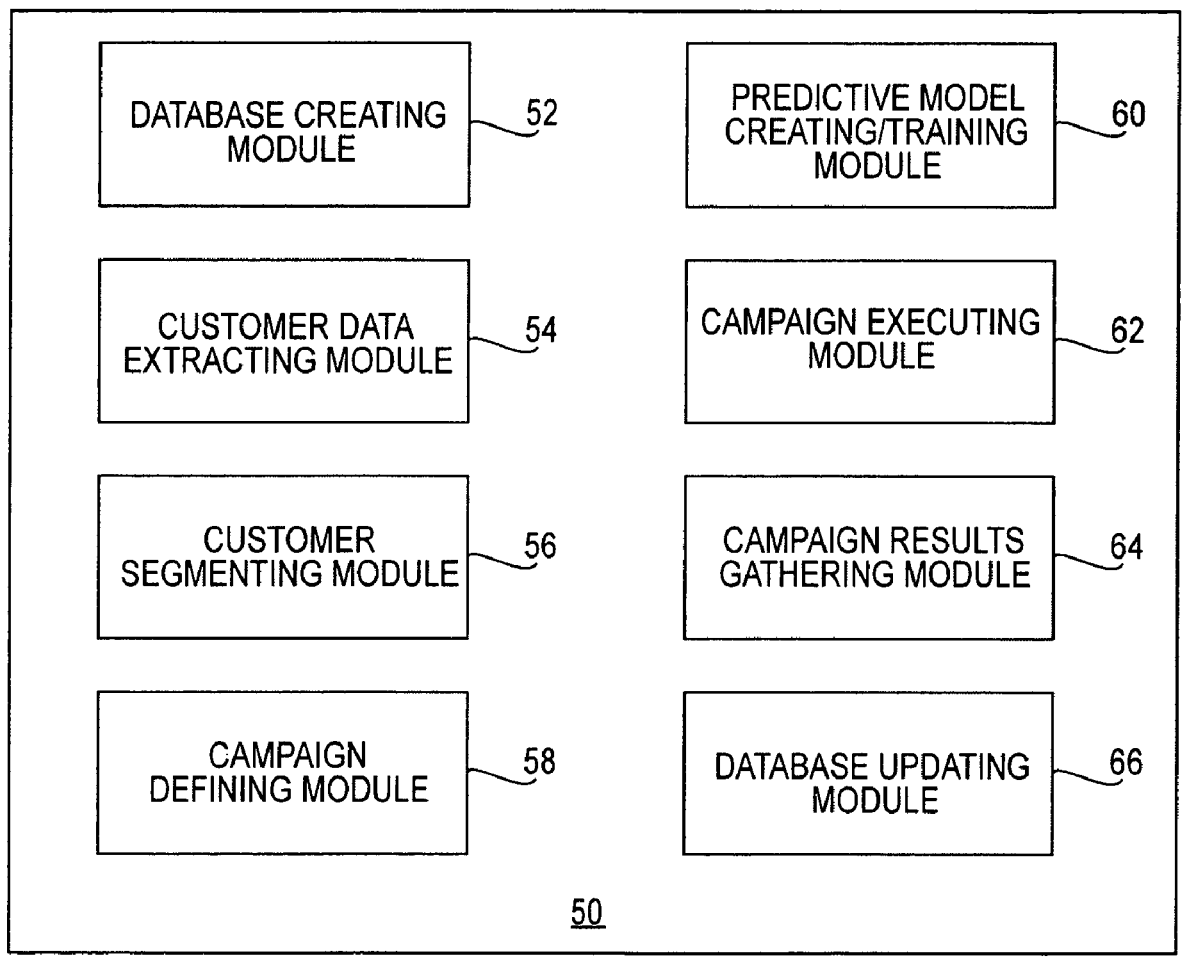
FIG. 2 is a block diagram of a system for adaptive marketing using insight driven customer interaction according to one embodiment of the invention.

FIG. 2 illustrates a system 50 for adaptive marketing using insight driven customer interaction according to one embodiment of the invention. The system 50 may include a database creating module 52 that provides a database for storing customer data. A customer data extracting module 54 may be used to extract, transform, and format the customer data from the database for segmentation and training a predictive model. A customer segmenting module 56 may be used to segment customer records that provide a profile of a customer into segments of customers that have similar characteristics. A campaign defining module 58 may be used to define a campaign for one or more customer segments identified by customer segmenting module 56. A predictive model creating/training module 60 may be used to create/train a predictive model for determining how a customer may react to a marketing offer. The predictive model may be created when a first marketing campaign is defined and trained when subsequent marketing campaigns are defined using insight obtained from the first marketing campaign. The predictive model may be used to predict customer behavior regarding one or more offers communicated to the customer. The predictive model may indicate, for example, that the customer is highly likely, likely, unlikely, or very unlikely to accept the offer. This assists in defining targeted treatments, offers, and marketing campaigns based upon an integrated view of the customer resulting in improved marketing campaigns.

Based on the predictive model, a campaign executing module 62 may be used to define and execute one or more campaigns to be communicated to the customer. The campaigns may include, for example, telephoning or mailing offers to the customers that are likely to accept the offer.

As a campaign is executed, the results of the campaign may be gathered. The results may include, for example, the number of offers accepted, the identification information for the customers who accepted the offers, the length of time between initiating the customer interaction and acceptance of the offer, and other information. The campaign results may be gathered using campaign results gathering module 64. The database storing the customer data may then be updated with the campaign results using database updating module 66. The campaign results may be used to refine additional customer interactions with the customers. For example, the customer results may show that a particular offer was not well received by the customers or that a particular segment of customers redeemed a large percentage of a particular offer. Therefore, based on this information, additional customer interactions may be refined to target the customer segment that accepted a large percentage of the offers. The offer not well received by the customers may be altered to induce future acceptance of the same or a similar offer or possibly canceled. The offers may be, for example, coupons to be used at restaurants, movie theaters, amusement parks, etc. or for services rendered.

Figure 3:
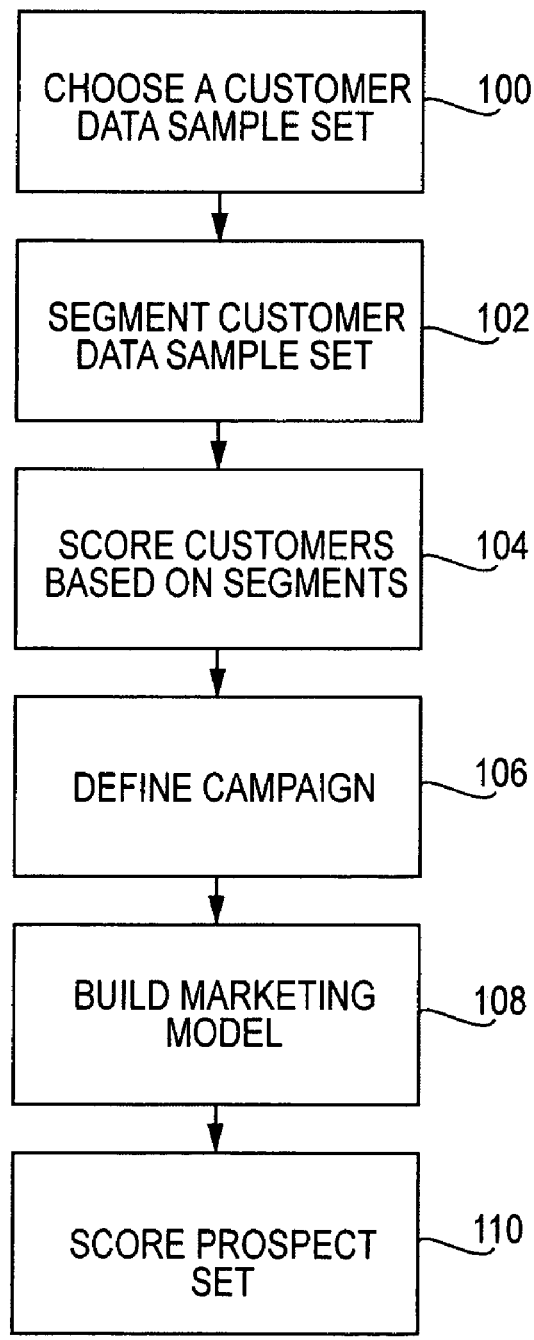
FIG. 3 is a block diagram of a method for segmentation and predictive modeling for adaptive marketing using insight driven customer interaction according to one embodiment of the invention.

FIG. 3 illustrates a method for training a predictive analytic model according to one embodiment of the invention. A predictive analytic model may be created/trained by choosing a customer data sample set, step 100. The sample set may be, for example, a percentage of customer records from a total number of customer records such as ten (10) percent. The sample set may be segmented to divide customers into segments having similar characteristics, step 102. The customers associated with each segment may be given a score to identify to which customer segment each customer belongs, step 104. A marketing campaign for one or more of the customer segments may be defined, step 106. The marketing campaign may include one or more offers to be delivered to the customers. A predictive marketing model is constructed to assess each customer's propensity to respond to an offer in the targeted customer segments, step 108.

The results from running the marketing model are used to score prospective customers, step 110. The prospect set may be used for determining which offers are to be communicated to which customers. According to one embodiment of the invention, KXEN technology may be used to build the marketing model and score the prospect set. According to one embodiment, the customers receiving the highest score may be deemed most likely to accept a particular offer. A lower score may indicate a lower acceptance response to the offer. Therefore, offers are preferably communicated to customers receiving high scores.

Figure 4:
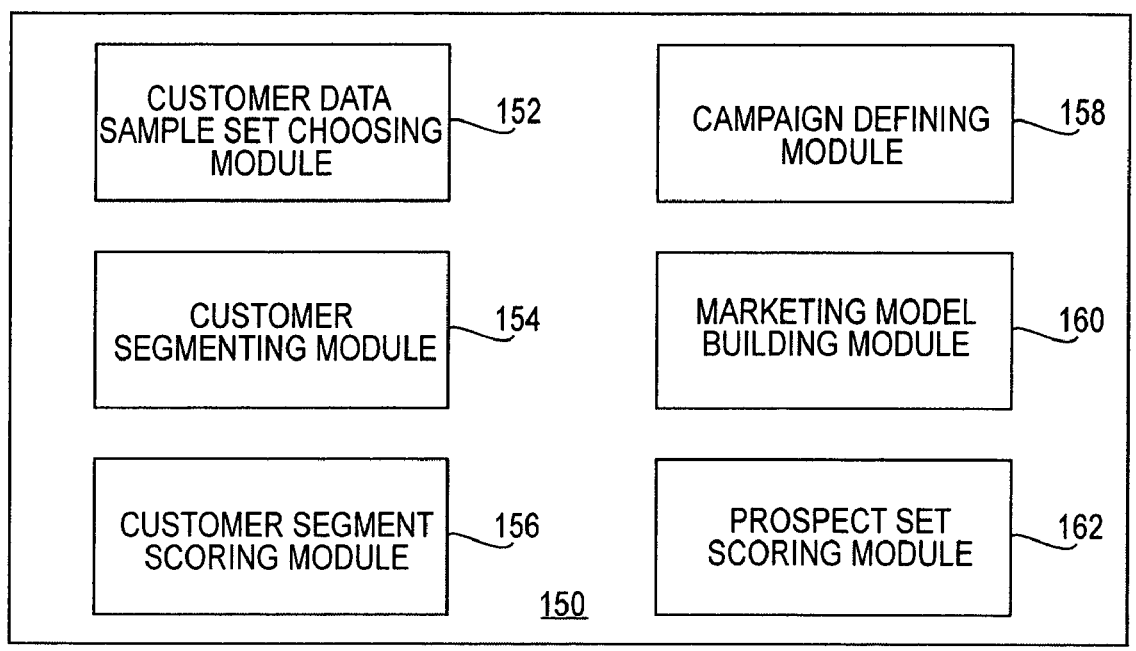
FIG. 4 is a block diagram of a system for segmentation and predictive modeling for adaptive marketing using insight driven customer interaction according to one embodiment of the invention.

FIG. 4 illustrates a system 150 for training a predictive analytic model according to one embodiment of the invention. The system 150 may include a customer data sample set choosing module 152. The customer data sample set choosing module 152 may choose a sample set of customer data to be used to group customers into segments. A customer segmenting module 154 may be used to segment customer records according to similar characteristics. A customer segment scoring module 156 may be used to update customer records to reflect their assigned segment created by customer segmenting module 154. Based on the profiles of each of the defined customer segments, a marketing campaign may be defined using campaign defining module 158. The marketing campaign may propose which offers are to be targeted to which customer segments.

Next, a marketing model is built to assess customers' propensity to respond to proposed offers using the marketing model building module 160. The marketing model may then be used to score a prospect set of customers using prospect set scoring module 162. Based on the results generated by the prospect set scoring module 162, the customers that receive a high score may be communicated an offer.

Figure 5:
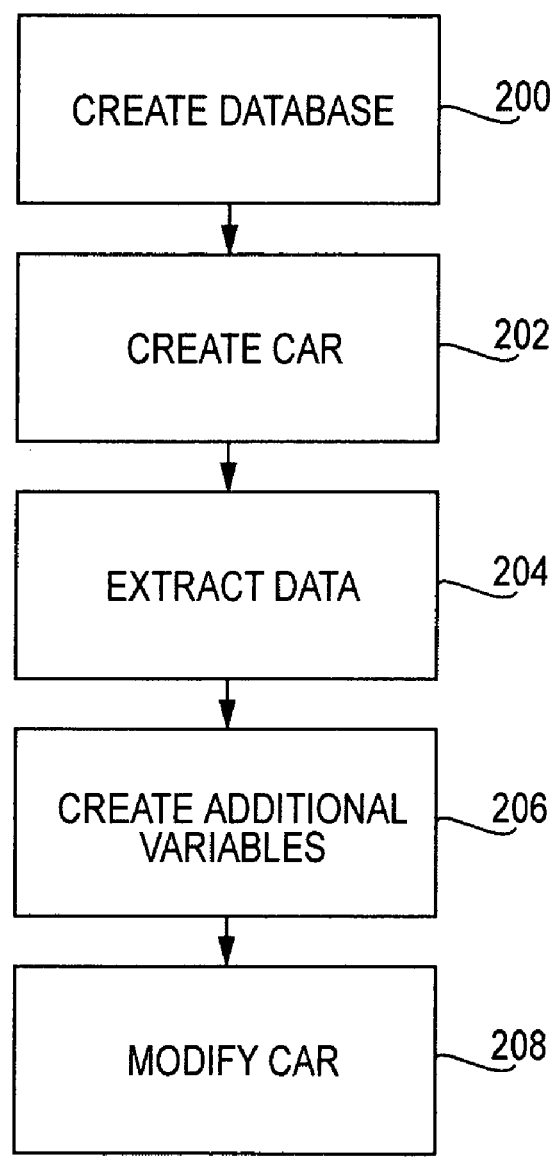
FIG. 5 is a block diagram of a method for creating a standardized input for analytic models for adaptive marketing using insight driven customer interaction according to one embodiment of the invention.

FIG. 5 illustrates a method for creating a standardized input for analytical models according to one embodiment of the invention. A database for storing customer data may be initially created, step 200. A CAR may be created to extract, transform, and format the customer data to be used as input for an analytic model, step 202. The CAR provides a database object that may include one or more database views and dynamic and temporary tables. Dynamic tables are automatically developed at the beginning of a query and destroyed when completed whereas temporary tables are usually pre-loaded with data and persist after the query has finished. Dynamic and temporary tables are typically used for performance reasons or to store data in a certain manner.

The customer data may be extracted from the database by running one or more queries on the CAR, step 204. The SQL queries against the CAR may themselves create additional variables by operating on the data returned by the CAR queries, step 206. Some examples of these transformations are slopes and ratio calculations. Slopes may be calculated when a customer record contains time series transaction data (e.g., number of transactions per week, account balance per month, etc). Plotting these trends on a time graph allows a straight line to be fitted through the points. The slope of the line is an indicator of whether the rate of transactions is increasing or decreasing over time. Ratios provide another good way to analyze data (e.g., the ratio of one customer's account balance compared to the average balance of all customers in the segment). These variables provide additional predictive power to models. For example, ratios-to-means and slopes are very important inputs to retention models. When the slope of a customer's account balance is decreasing at a high rate, determined by the ratio of decline compared to the mean, it's a good predictor that the customer is planning to take his or her business to another establishment. If the business recognizes this trend in advance and identifies that this is a high value customer, it can take measures to attempt to retain the customer.

The CAR is a method of setting up virtual stored queries that include table fields as well as calculated fields created using capabilities of a Data Base Management System (DBMS) and a structured query language (SQL) such that the stored queries present to the user a virtual flat file that may be used as input to an analytic engine. The capabilities of the DBMS and SQL may include, for example, (1) functional objects available within SQL to perform certain statistical and mathematical operations on data retrieved from the database: e.g., average, standard deviation, ranking, moving averages, regression, logarithmic transformation, sequence analysis, etc.; (2) ability to process and complete queries that may contain one or more mathematical or statistical operations against a 3rd Normal Form database, which implies the ability to join many tables to produce the query answer sets; (3) the capability to express these complex queries as an object in the database, either as a view or as a pre-defined function usable in a SQL query; (4) the capability to nest these views and otherwise combine them into other higher-level views or in ad hoc SQL queries; (5) the ability to create dynamic or temporary relational tables on the fly (during the course of execution of queries); (6) the ability to define and query these views and other data objects within a very large relational database that may be dozens of terabytes in size, that may contain tables with billions of rows of data.

If additional variables are created, from CAR data or database data during modeling or analysis processes, the CAR may be modified to include the additional variables, step 208. In this manner, the additional variables become part of the CAR and are available for future modeling and analytic requirements.

Figure 6:
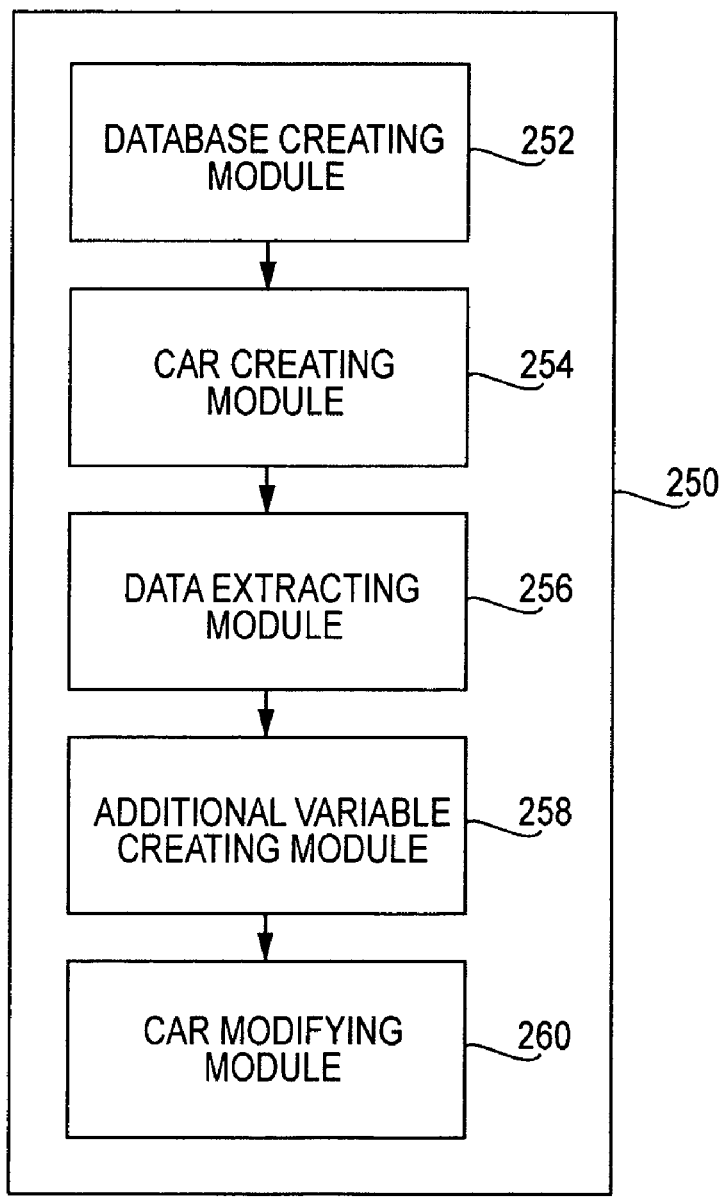
FIG. 6 is a block diagram of a system for creating a standardized input for analytic models for adaptive marketing using insight driven customer interaction according to one embodiment of the invention.

FIG. 6 illustrates a system 250 that may be used for creating a standardized input for analytical models according to one embodiment of the invention. The system 250 may include a database creating module 252. The database creating module 252 may provide a database for storing customer data. A CAR may be created for the purpose of extracting, transforming, and formatting the customer data to be used as input for an analytic model using CAR creating module 254. The CAR preferably provides a database object that may include one or more views. A customer data extracting module 256 may be used to extract the customer data from the database using the CAR. The customer data may be extracted by running one or more queries against the view(s). Based on the data queried, additional variables may be created by the CAR view(s) using additional variable creating module 258. If additional variables are created, the CAR may be modified to include the additional variables using CAR modifying module 260. The CAR may then be used to provide standardized input for analytical models. The CAR preferably includes all of the information necessary to predict customer behavior and define targeted customer interactions with a customer.

Figure 7A:
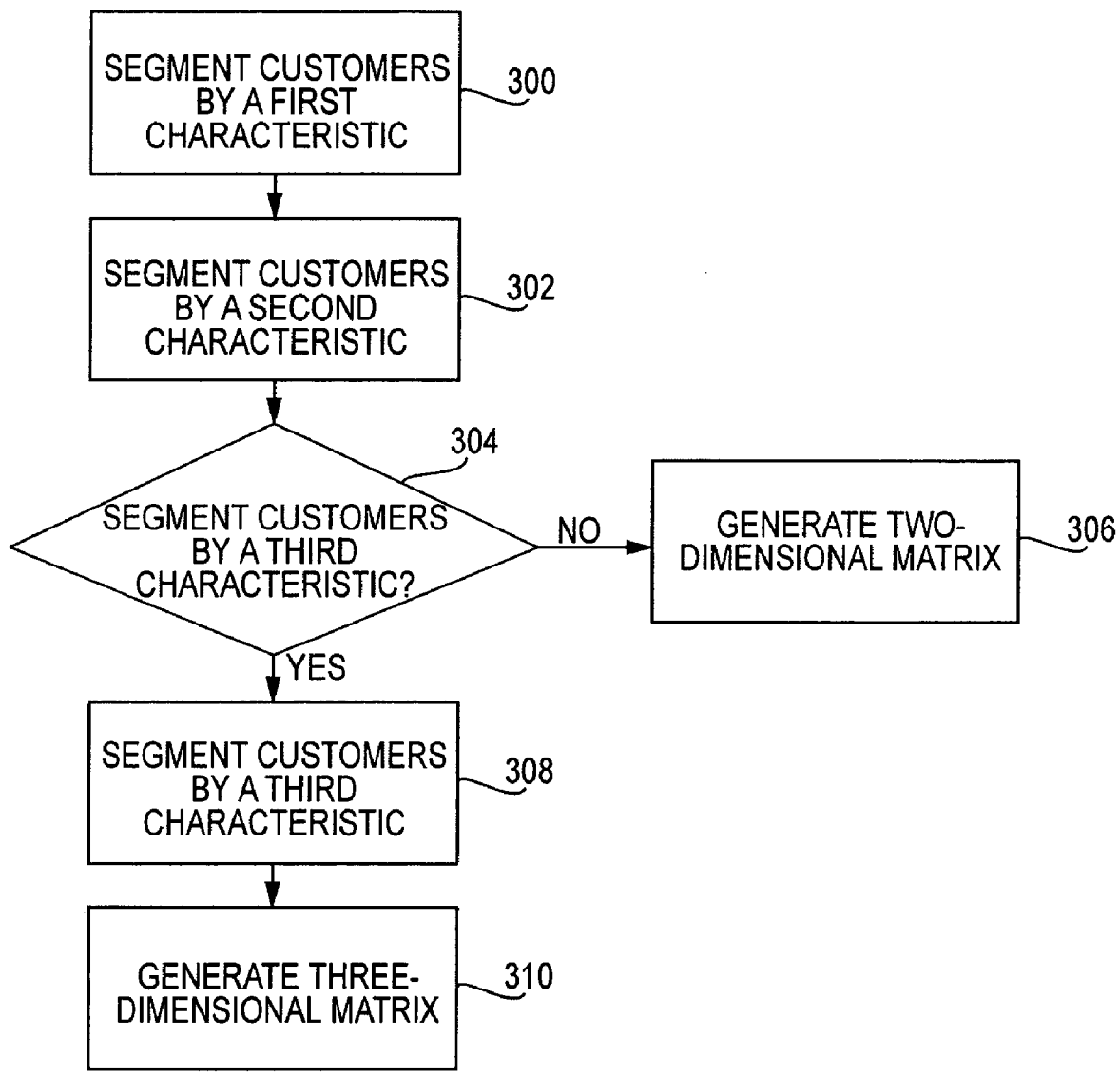
FIG. 7A is a method for developing multi-dimensional segmentation according to one embodiment of the invention.

FIG. 7A illustrates a method for segmenting data representing a plurality of customers for use in a customer interaction according to one embodiment of the invention. Customer data may be segmented according to a first characteristic, step 300. The first characteristic may include, for example, behavior data. To execute behavior segmentation, preferably, only the variables of the CAR, both direct and derived, that reflect a customer's behavior are used. Examples of such variables that reflect behavior are the number of transactions, rate of increase of the number of transactions, average value per transaction, etc. Preferably, demographic variables are not used for generating behavioral segmentation. After the segments have been identified, the segments may be profiled with all of the variables including any demographic variables.

The customer data may then be segmented according to a second characteristic, step 302. The second characteristic may be, for example, value data. For the value segmentation, the variables that are used are preferably indicative of customer value. In one embodiment, the customer lifetime value may be used as the driving variable for this segmentation. Other value indicators like profitability, etc. may be used. A determination may then be made regarding whether the customer data is to be segmented according to a third characteristic, step 304. If the customer data is not to be segmented according to the third characteristic, a two-dimensional matrix for cross-segmenting the customers by both behavior data and value data may be generated, step 306. To do this, the value segments and the behavior segments may be "overlayed" and the behavior-value crossed segments may be profiled to get a joint view. If, however, a determination is made that the customer data is to be segmented according to a third characteristic, the customer data may segmented by a third characteristic, step 308.

After segmenting the customer data according to a third characteristic, a three-dimensional matrix for cross-segmenting a plurality of customers by the first, second, and third characteristics may be generated, step 310. The segmentation may be expanded to many data types generating a multi-dimensional hypercube that more completely characterizes the customers.

In the behavior-value segmentation embodiment of the invention, the segmentation may be performed by using a cluster analysis algorithm to identify latent clusters in the data. Most algorithms typically identify clusters that have a low ratio of within cluster variability to across cluster variability using some standard distance metrics. According to one embodiment of the invention, the algorithm used is driven by a business objective. This in turn permits the distance metrics that are used in the cluster analysis to be calibrated in the context of the stated business objective. In other words, the invention generates clusters that are more closely aligned with the business case and is therefore a semi-supervised segmentation as opposed to a completely unsupervised segmentation.

The approach to two dimensional modeling described above regarding behavior and value data may be applied to other characteristics that may influence customer behavior, such as, for example, attitude, satisfaction, brand experience, brand attachment, brand utility, and category involvement. Attitude may reflect a holistic view of a firm held by a customer. Satisfaction may be a day-to-day satisfaction resulting from current transactions between the customer and a firm. The brand experience may be the cumulative effect of dayto-day satisfaction. Brand attachment may be an attitude or feeling toward a brand by a customer. For example, brand attachment may be strongly influenced by advertising. Non-customers such as HARLEY DAVIDSON™ brand motor-cycle aficionados may have a strong brand attachment. Attachment may be reinforced positively or negatively by brand experience. Brand utility may be a need for goods or services provided by a firm. The brand utility may be affected by lifestyle and life-stage factors. Category involvement may be a need for specific products and/or services. Category involvement may also be affected by lifestyle and life-stage factors.

Figure 7B:
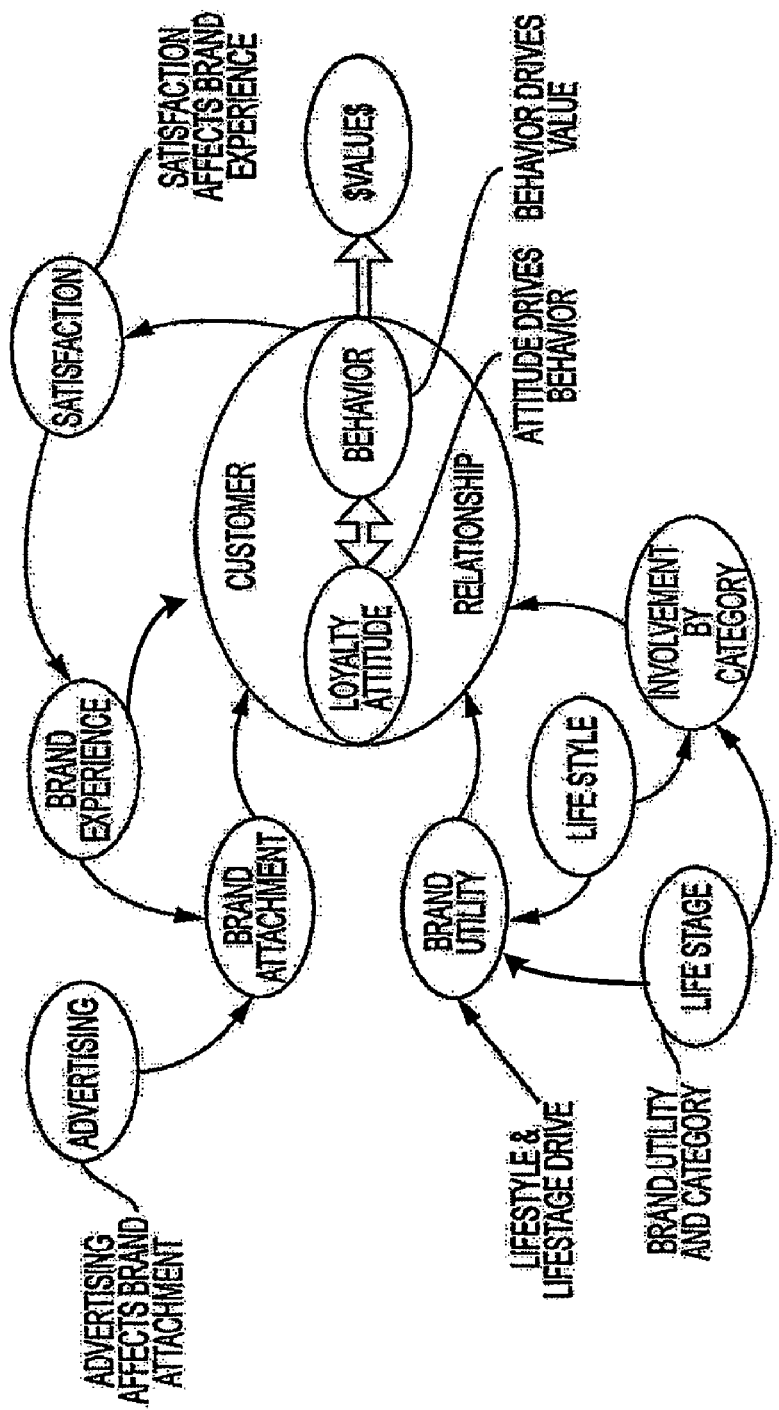
FIG. 7B is an illustration of relationships among characteristics that may drive customer behavior.

Applicants of this invention have found that there may be relationships between these characteristics that may ultimately affect customer behavior. FIG. 7B illustrates that: attitude drives behavior; behavior drives value; the relationship experience felt by the customer impacts customer satisfaction; satisfaction affects brand experience; brand experience affects brand attachment which is also impacted by advertising; life-stage and lifestyle affect brand utility and involvement by category; attitude is affected by brand experience, brand attachment, brand utility, and involvement by category; etc.

Figure 8:
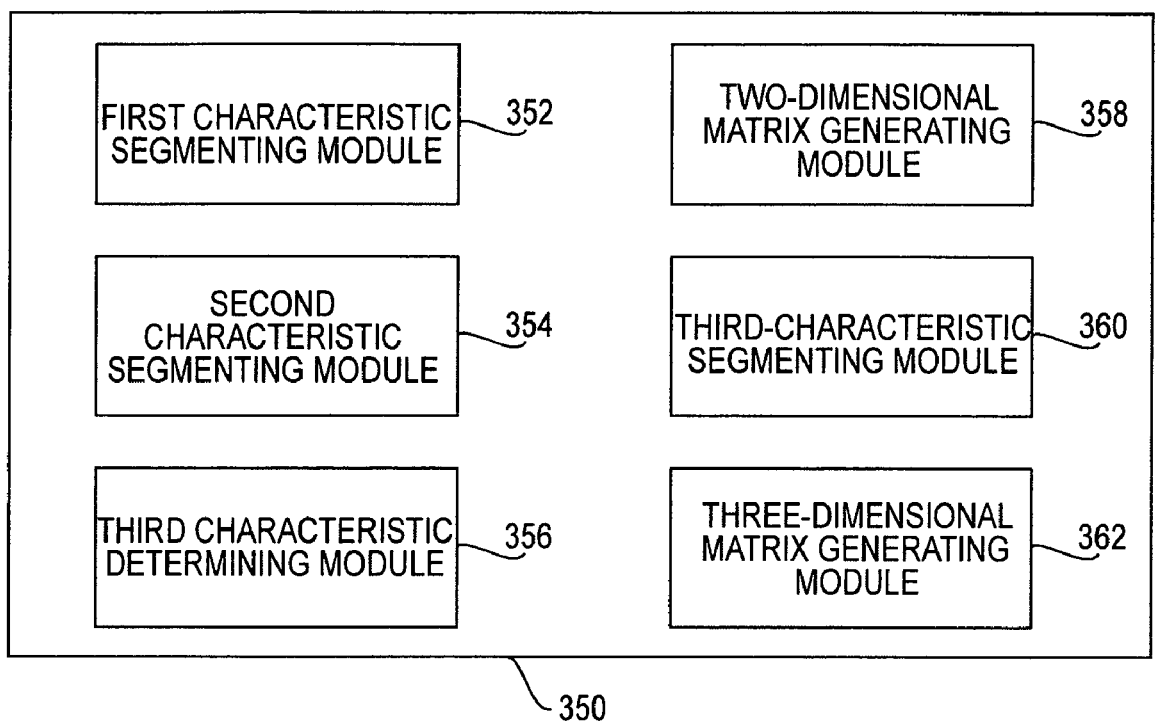
FIG. 8 is a system for developing multi-dimensional segmentation according to one embodiment of the invention.

FIG. 8 illustrates a system 350 for segmenting data representing a plurality of customers for use in a customer interaction according to one embodiment of the invention. The system 350 may include a first characteristic segmenting module 352. The first characteristic segmenting module 352 may segment the customer data according to a first characteristic. The first characteristic may be, for example, behavior, attitude, value, satisfaction, brand experience, brand attachment, brand utility, or category involvement. A second characteristic segmenting module 354 may be used to segment the customer data according to a second characteristic. The second characteristic may be, for example, any of the first characteristics not segmented. A third characteristic determining module 356 may be used to determine whether the customer data is to be segmented according to a third characteristic. If a determination is made that the customer data is not to be segmented according to a third characteristic, a two-dimensional matrix for cross-segmenting a plurality of customers by the first and second characteristics may be generated using two-dimensional matrix generating module 358. The segmentation may be expanded to many data types generating a multi-dimensional hypercube that more completely characterizes the customers.

If third characteristic determining module 356 determines that the customer data is to be segmented according to a third characteristic, a third characteristic segmenting module 360 may be used to segment the customer data according to the third characteristic. The third characteristic may be any of the characteristics not segmented by the first characteristic segmenting module 352 and the second characteristic segmenting module 354. After segmenting the customer data according to the third characteristic, a three-dimensional matrix generating module 362 may be used to generate a three-dimensional matrix for cross-segmenting the plurality of customers by the first, second, and third characteristics.

Figure 9:
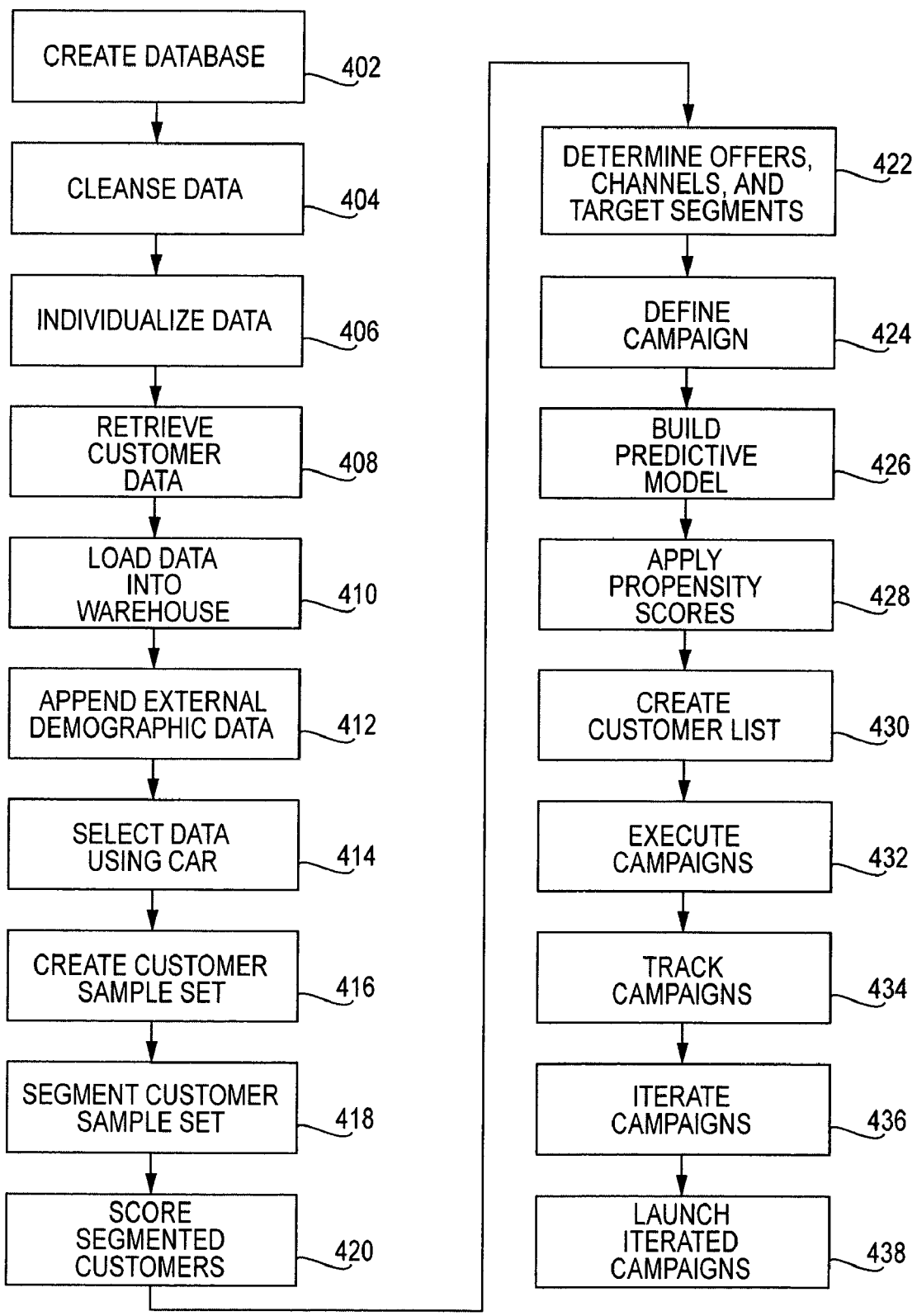
FIG. 9 is a method for adaptive marketing using insight driven customer interaction according to one embodiment of the invention.

FIG. 9 illustrates a method for adaptive marketing using insight driven customer interaction according to one embodiment of the invention. A database may be created, step 402. The database may be used to store customer data. The data may be cleansed (such as by removing duplicate records), step 404, and individualized, step 406. Individualizing the data may include providing an identifier to customer data that indicates the particular customer for whom that data was gathered. This enables the data to be cross-referenced easily according to a customer identifier. The customer data may be retrieved from a plurality of databases, step 408. The customer data may then be loaded into, for example, a data warehouse, step 410. The customer data may be appended with demographic data for each customer gathered, step 412. The demographic data may be gathered from external sources. When a business wants to optimize the value of its customer relationships, it must learn to tailor customer interactions to the needs of its customers. To do this, a company needs to obtain an integrated view of the customer, segment its customers into groups, and assess how customers behave and will respond to various offers. Selecting data using the CAR may be the first step in the process, step 414. The data selected may be used to create a sample set of customer records for segmentation as well as drive predictive modeling.

A sample set of customer records may be created to reduce a number of customers for which customer segmenting may be performed, step 416. Preferably, the sample set is chosen at random, however, other methods may also be used. By using a random sample set, fewer customer records are used for segmentation while generating a substantially accurate depiction of customers. The customer records may be divided into segments, step 418. The customers within the segments may have one or more similar characteristics. The customers within the segments may be given a score, step 420. The score may be based on the segmentation results and quantitatively represent a customer. The marketing offer(s) to be delivered to the customers may be determined, a delivery channel determined, and the segments to be targeted identified, step 422. A campaign the offers proposed to targeted segments may be defined, step 424. The campaign may include marketing offers such as coupons or other incentives for purchasing a particular product or service.

A predictive model may be built to predict how customers may react to the marketing offers and which customers in a particular segment should receive the offers, step 426. The predictive model may provide propensity scores for the customers. The propensity scores may indicate which customers are more likely to accept a marketing offer. The propensity scores may then be applied to the customer data, step 428. A customer list may be created to identify which customers should be given the offer, step 430. The campaign may then be executed, step 432. This may include communicating the marketing offers to the customers via a customer interaction. The customer interaction may be a telephone call with a telemarketer, an electronic mail message, an offer received via regular mail, etc. Depending on how a customer reacts to the marketing offer, the marketing campaign may be adjusted accordingly. For example, if the customer provides a telemarketer with information that the telemarketer believes will induce the customer to accept a marketing offer, the telemarketer may customize the marketing offer for that customer.

The campaign results may be tracked, step 434. Tracking the campaign may include determining which customers have redeemed a marketing offer, which marketing offer was redeemed, and the time elapsed between communicating the marketing offer to the customer and when the offer was redeemed. Campaign tracking may also include updating the database with the campaign results. The campaign results may then be used to further refine existing campaigns or to define additional campaigns. After refining existing campaigns and defining one or more additional campaigns, the campaigns may be iterated, step 436. By iterating through campaigns, insight may be developed regarding how a customer may respond to marketing offers. This insight may then be used to generate more predictive models regarding a customer's behavior toward marketing offers in general or to specific types of marketing offers. Subsequent campaigns may then launched, step 438, using the insight developed such that the subsequent campaigns may produce a higher result of redeemed offers. The method for adaptive marketing using insight driven customer interaction may be repeated as desired to generate additional refined marketing campaigns.

Figure 10:
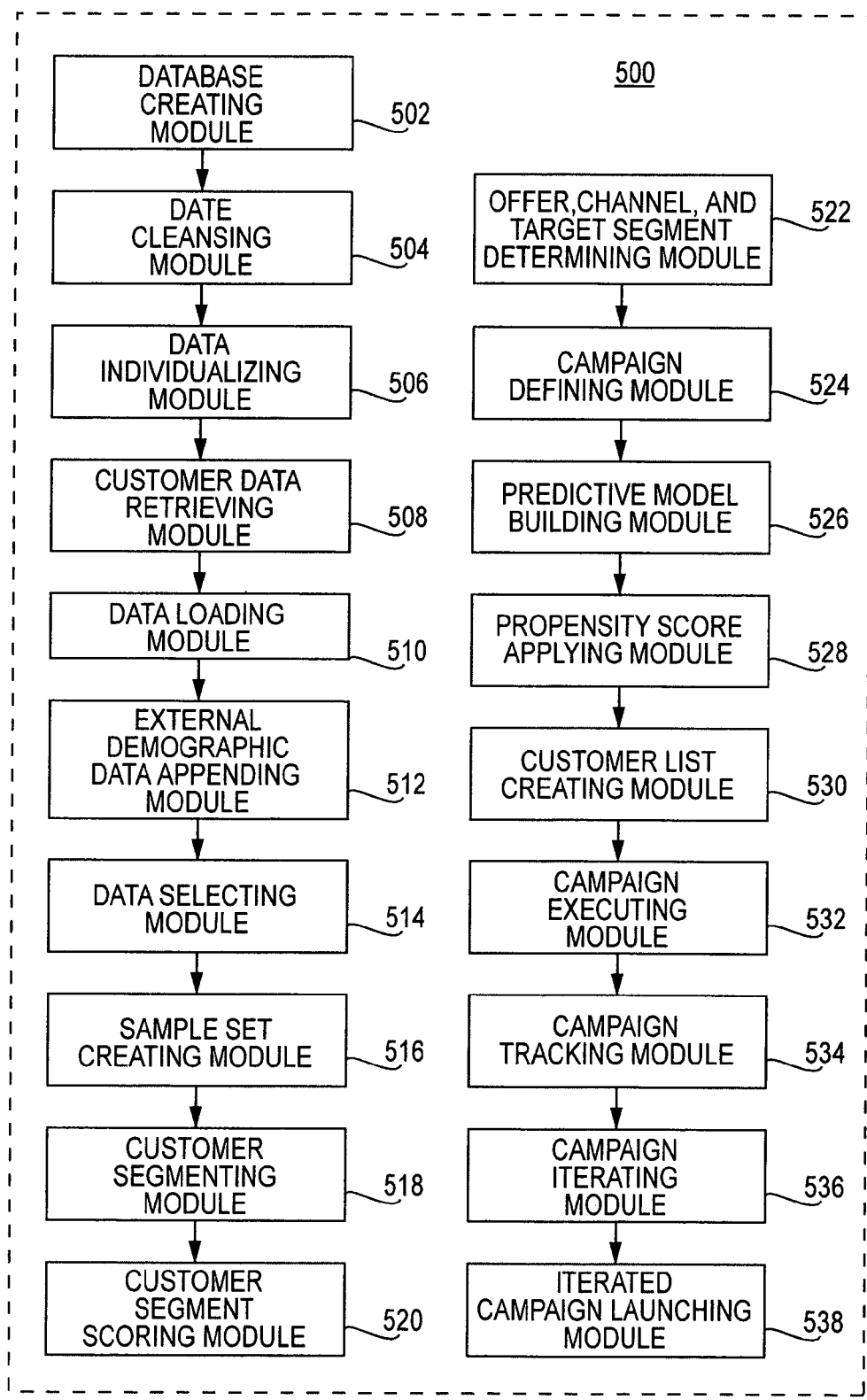
FIG. 10 is a system for adaptive marketing using insight driven customer interaction according to one embodiment of the invention.

FIG. 10 is a block diagram of a system 500 for adaptive marketing using insight driven customer interaction. The system 500 may include a database creating module 502. The database creating module 502 may be used to create a database for storing customer data that may be used for defining a marketing campaign. A data cleansing module 504 may be used to cleanse the data, such as by performing de-duplication. A data individualizing module 506 may be used to individualize the data for each customer that the data refers. The customer data may be retrieved from a plurality of databases using customer data retrieving module 508. A data loading module 510 may be used to load the cleansed and individualized data into, for example, a data warehouse. The data may then be appended with demographic data obtained related to each customer using external demographic data appending module 512. The demographic data may be, for example, obtained from an external data source.

A customer data selecting module 514 may be used to select customer data using the CAR. The CAR preferably includes all of the information needed about a customer that may be needed to group customers into segments and prepare predictive models. A sample set of customer records may be created to reduce a number of customers for which customer segmenting may be performed using sample set creating module 516. Preferably, the sample set is chosen at random, however, any method may be used. The customer records may be divided into segments using customer segmenting module 518. The customers within the segments may have one or more similar characteristics. The customers within the segments may be given a score using customer segment scoring module 520. The score may be based on the segmentation results and be used to quantitatively represent the customer. The marketing offer(s) that are to be delivered to customers may be determined along with a marketing channel and target segment(s) using offer, channel, and target segment determining module 522. The marketing channel may be, for example, electronic mail, regular mail, facsimile, telephone call, etc. Based on the offer(s), channel(s), and segment(s) determined, a marketing campaign may be defined using marketing campaign defining module 524.

A predictive model may be built using predictive model building module 526. The CAR prepared using CAR preparing module 254 may be used to select the customer data needed as input to the predictive model. The predictive model may be used to predict customer behavior regarding how a customer may respond to particular marketing offers. The predictive model may generate a propensity score for the customers. The propensity score may indicate how likely a customer is to accept a marketing offer. A higher score may indicate that customers within that segment are more likely to accept a particular marketing offer. The propensity score may then be applied to the customer data, step 528.

A customer list may be created to identify which customers should receive the offer using customer list creating module 530. The campaign may then be executed using campaign executing module 532. The campaign may be executed, for example, by mailing the offers via regular mail or electronic mail, telephoning the customers, or initiating some other kind of customer interaction.

The results of the campaign may be tracked using campaign tracking module 534. The results may include, for example, which marketing offers were accepted, which customers accepted the offers, and the time elapsed between offer and acceptance. This information may be used to iterate additional campaigns using campaign iterating module 536. The results may provide insight regarding customer behavior that may be used to refine additional marketing campaigns to increase the likelihood that a customer will accept the marketing offer. The iterated campaigns may be launched using iterated campaign launching module 538.

While the specification describes particular embodiments of the present invention, those of ordinary skill can devise variations of the present invention without departing from the inventive concept. For example, although the invention has been described in terms of a marketing campaign, the invention may be used with any type of customer interaction. For instance, customers who are the target of a marketing campaign may be given an offer if the customers call a particular business with a service request. Similarly, targeted customers may be given an offer when meeting in person with a sales representative of a business to conduct a sales transaction.

The marketing promotion may be offered as follows. Assume that a bank has executed the adaptive marketing steps described above to the point of defining a marketing campaign whereby on-line banking customers with a combined family income exceeding $100,000 per year will be offered a Platinum Mastercard™. The marketing offer may be defined in an offer database when the campaign is to be executed. The customers who are the target of the offer may be flagged. This information may be accessed and used when a targeted customer engages with the bank for any sort of transaction.

If the customer calls one of the bank's call centers to make a service request (e.g., validate the balance in an account, make an inquiry about a bank statement, etc), the call center agent may be given information that this customer is the target for the Platinum Mastercard™ promotion which could be offered after the service request is fulfilled. Similarly, if the customer is servicing an account using an on-line banking application, a web-based application may determine that the customer is the target of the marketing promotion and deliver the offer to the customer. If the customer visits a bank branch to open an account or buy a Certificate of Deposit, a sales agent may determine that the customer is the target of the promotion and offer the promotion to the customer.

Therefore, the adaptive marketing flow could affect all forms of customer interaction across multiple customer interaction channels. Note that the result of any interaction may be loaded into the customer data warehouse and later extracted to retrain the analytical models and either define new, improved marketing campaigns or to better target existing campaigns. All forms of interaction may benefit from and contribute to the iterative nature of the adaptive marketing process.

While the specification describes particular embodiments of the present invention, those of ordinary skill can devise variations of the present invention without departing from the inventive concept.

We claim:

1. A computer-implemented method for performing insight-driven, adaptive marketing activities, comprising:

providing a system comprising at least one memory to store instructions, at least one processor having a plurality of software modules, and at least one database embodied on computer-readable medium to store customer data for a plurality of customers, wherein the plurality of software modules comprise a customer data extracting software module, a training software module, a customer selection module, a campaign tracking module, a data individualizing module, and an insight module; and wherein the software modules access the customer data stored in the at least one database and the instructions stored in the at least one memory; and executing the instructions by the at least one processor to perform:

extracting the customer data from the at least one database by the customer data extracting software module, the customer data including data fields comprising identification fields for household information and individual information, behavior fields, demographic fields, contact history fields, analytic model score fields, and ownership fields, the analytic model score fields including a household identifier and an individual identifier to identify individuals in a household for cross-referencing the customers to households and for cross-referencing the individuals to the customer data in other data fields;

training an analytic model with the training software module to predict customer behavior and produce predicted customer behavior data from analysis of the extracted customer data;

the analytic model predicting behavior of each of the customers, the behavior comprising response by the customers to a plurality of marketing offers via a plurality of interaction channels used to communicate the plurality of marketing offers; and the analytic model producing a plurality of scores, each of the scores comprising an indicator of a likelihood of response by a selected customer to a selected marketing offer via a selected interaction channel;

wherein training comprises:
choosing a sample set of the customers from the customer data;
segmenting the sample set of the customers:
describing the segments with lift values, each of the lift values comprising an indicator of a likelihood of response by a selected customer segment to the selected marketing offer;
scoring all customers based on segments;
defining a targeted marketing campaign comprising a targeted marketing offer and a targeted interaction channel;
building an analytical model; and
scoring a prospect set with the analytical model, wherein the prospect set comprises all customers in a targeted segment;

selecting a targeted set of the customers from the at least one database by the customer selection module, the selecting based on a determination, from the scores, of customers most likely to respond to the targeted marketing offer via the targeted interaction channel;

executing the targeted marketing campaign with the targeted set of the customers, the targeted marketing offer, and the targeted interaction channel to deliver the targeted marketing offer to the targeted set of customers via the targeted interaction channel;

gathering campaign results data from the targeted marketing campaign by the campaign tracking module, the gathering including
collecting results data of a count of the customers accepting the targeted marketing offer via the targeted interaction channel, identification information for the customers accepting the targeted marketing offer via the targeted interaction channel, and time statistics related to acceptance of the targeted marketing offer via the targeted interaction channel, wherein the time statistics comprise a length of time between the targeted marketing offer and the acceptance of the targeted marketing offer;

updating the customer data in the at least one database based on the campaign results data, the updating further comprising individualizing, by the data individualizing module, the campaign results data for the customers associated with the campaign results for associating the campaign results data with the individuals for cross-referencing the individuals to the updated customer data in the data fields;

obtaining insight from the campaign results data with the insight module by comparing the predicted customer behavior data to actual customer behavior data produced in response to the targeted marketing campaign; and repeating the extracting, training, selecting, executing, gathering, updating, and obtaining the insight for at least one additional targeted marketing campaign to deliver an additional targeted marketing offer to an additional targeted set of customers via an additional targeted interaction channel in a closed-loop process to obtain additional insight, wherein insight obtained from each targeted marketing campaign is used to refine and simplify subsequent customer data extraction, analytic model training, and customer selection, and wherein the analytic model is re-trained based on how the customers respond to various types of the marketing offers and to various types of the interaction channels used in each targeted marketing campaign.

2. The computer-implemented method of claim 1, wherein the training comprises:
segmenting the customer data for the plurality of customers;
defining the targeted marketing campaign; and
building the analytical model.

3. The computer-implemented method of claim 2, wherein the segmenting the customer data is performed using a two-dimensional matrix.

4. The computer-implemented method of claim 3, wherein the segmenting the customer data comprises using variables that indicate a customer's behavior.

5. The computer-implemented method of claim 4, wherein the segmenting the customer data comprises excluding variables that indicate demographic data.

6. The computer-implemented method of claim 5, wherein the segmenting the customer data comprises identifying at least one segment of the customers.

7. The computer-implemented method of claim 6, wherein the segmenting the customer data comprises profiling the segments with all variables including demographic data variables.

8. The computer-implemented method of claim 3, wherein the segmenting the customer data comprises using variables that indicate a customer value.

9. The computer-implemented method of claim 8, wherein the segmenting the customer data comprises using a customer lifetime value as a driving variable.

10. The computer-implemented method of claim 8, wherein the segmenting the customer data comprises identifying at least one segment of customers.

11. The computer-implemented method of claim 3, wherein the segmenting the customer data comprises overlaying value segments and behavior segments.

12. The computer-implemented method of claim 11, wherein the segmenting the customer data comprises profiling the value segments and behavior segments overlayed.

13. The computer-implemented method of claim 1, wherein the training for the at least one additional targeted marketing campaign comprises using the campaign results data gathered from the targeted marketing campaign.

14. The computer-implemented method of claim 1, wherein the extracting the customer data comprises:
 selecting data from at least one database view that comprises at least a portion of data from the database and at least one transform that has been developed from the data from the database.

15. The computer-implemented method of claim 1, wherein the extracting the customer data comprises:
 selecting data from at least one database view that comprises at least a portion of the data from the database and at least one transform that has been developed from data from the database, wherein a database object includes the at least one database view.

16. The computer-implemented method of claim 15, wherein the database object creates a standard virtual flat file record.

17. The computer-implemented method of claim 16, wherein the database object is enabled using a database management system and a structured query language.

18. The computer-implemented method of claim 16, wherein the standard virtual flat file record contains data to assist with insight driven customer interaction.

19. The computer-implemented method of claim 16, wherein the standard virtual flat file record for each of the plurality of customers comprises data regions for identification, product ownership, behavior, demographics, model scores, and contacts.

20. The computer-implemented method of claim 19, wherein each of the data regions is a database view.

21. The computer-implemented method of claim 19, wherein the data regions comprise a predetermined grouping that is a complete input stream needed to perform a plurality of various customer analytical modeling wherein no additional data is required.

22. The computer-implemented method of claim 1, further comprising creating at least one additional variable.

23. The computer-implemented method of claim 1, wherein extracting the customer data includes performing data extracts, transformations, combinations or aggregations against a data warehouse.

24. The computer-implemented method of claim 1, wherein the extracting comprises performing a plurality of queries against the at least one database.

25. A system, comprising:
 at least one processor; and
 at least one memory storing instructions operable with the at least one processor for executing one or more iterations of insight-driven, adaptive marketing activities in a closed loop process, the instructions structured throughout a plurality of modules, said modules comprising:
  a customer data extracting module configured to extract customer data for a plurality of customers from at least one database, the customer data including data fields comprising identification fields for household information and individual information, behavior fields, demographic fields, contact history fields, analytic model score fields, and ownership fields, the analytic model score fields including a household identifier and an individual identifier to identify individuals in a household for cross-referencing the customers to households and for cross-referencing the individuals to the customer data in other data fields;
 a training module configured to train an analytic model to predict customer behavior and produce predicted customer behavior data from analysis of the extracted customer data;
  the analytic model configured to predict behavior of each of the customers, the behavior comprising response by the customers to a plurality of marketing offers via a plurality of interaction channels used to communicate the plurality of marketing offers; and
  the analytic model configured to produce a plurality of scores, each of the scores comprising an indicator of a likelihood of response by a selected customer to a selected marketing offer and a selected interaction channel;
 a choosing module configured to choose a sample set of the customers from the customer data;
 a segmenting module configured to segment the sample set of the customers;
 a segment description module configured to describe the segments with lift values, each of the lift values comprising an indicator of a likelihood of response by a selected customer segment to the selected marketing offer;
 a segment scoring module configured to score all customers based on the segments;
 a defining module configured to define a targeted marketing campaign comprising a targeted marketing offer and a targeted interaction channel;
 a building module configured to build an analytical model;
 a prospect set scoring module configured to score a prospect set with the analytical model, wherein the prospect set comprises all customers in a targeted segment;
 a customer selecting module configured to select a targeted set of customers from the at least one database for use in the targeted marketing campaign based on a determination, from the scores, of customers most likely to respond to the targeted marketing offer via the targeted interaction channel;
 an execution module configured to execute the targeted marketing campaign with the targeted set of the customers, the targeted marketing offer, and the targeted interaction channel to deliver the targeted marketing offer to the targeted set of customers via the targeted interaction channel;
 a gathering module configured to gather campaign results data from the targeted marketing campaign and to collect
  results data of a count of the customers accepting the targeted marketing offer via the targeted interaction channel,
  identification information for the customers accepting the targeted marketing offer via the targeted interaction channel, and
  time statistics related to acceptance of the targeted marketing offer via the targeted interaction channel, wherein the time statistics comprise a length of time between the targeted marketing offer and the acceptance of the targeted marketing offer;

an updating module configured to update the customer data in the at least one database based on the campaign results data, the updating module further comprising a data individualizing module configured to individualize the campaign results data for the customers associated with the campaign results for associating the campaign results data with the individuals for cross-referencing the individuals to the updated customer data in the data fields;

an insight module configured to obtain insight from the campaign results data for at least one additional targeted marketing campaign by comparing the predicted customer behavior data to actual customer behavior data produced in response to the targeted marketing campaign, wherein the insight is obtained to deliver an additional targeted marketing offer to an additional targeted set of customers via an additional targeted interaction channel in a closed-loop process to obtain additional insight;

an analysis module configured to analyze the insight obtained from each targeted marketing campaign to refine and simplify subsequent customer data extraction, analytic model training, and customer selection, wherein the analytic model is configured to be re-trained based on how the customers respond to various types of the marketing offers and to various types of the interaction channels used in each targeted marketing campaign.

26. The system of claim 25, wherein the segmenting module is configured to use a two-dimensional matrix.

27. The system of claim 26, wherein the segmenting module is configured to use variables that indicate a customer's behavior.

28. The system of claim 27, further comprising:
an excluding module configured to exclude variables that indicate demographic data.

29. The system of claim 28, further comprising:
an identifying module configured to identify at least one segment of customers.

30. The system of claim 29, further comprising:
a profiling module configured to profile the at least one segment with all variables including demographic data variables.

31. The system of claim 26, wherein the segmenting module is configured to use variables that indicate a customer value.

32. The system of claim 31, wherein the segmenting module is configured to use a customer lifetime value as a driving variable.

33. The system of claim 31, further comprising:
an identifying module configured to identify at least one segment of the customers.

34. The system of claim 26, further comprising:
an overlaying module configured to overlay value segments and behavior segments.

35. The system of claim 34, further comprising:
an overlay profiling module configured to overlay the value segments and behavior segments overlayed.

36. The system of claim 25, wherein the training module is configured to use the campaign results data gathered from the targeted marketing campaign.

37. The system of claim 25, further comprising:
a data selecting module configured to select data from at least one database view that comprises at least a portion of data from the database and at least one transform that has been developed from the data from the database.

38. The system of claim 25, further comprising:
a data selecting module configured to select data from at least one database view that comprises at least a portion of data from the database and at least one transform that has been developed from the data from the database, wherein a database object includes the at least one database view.

39. The system of claim 38, wherein the database object is configured to create a standard virtual flat file record.

40. The system of claim 39, wherein the database object is enabled using a database management system and a structured query language.

41. The system of claim 40, wherein the standard virtual flat file record contains data to assist with insight driven customer interaction.

42. The system of claim 40, wherein the standard virtual flat file record for each of the plurality of customers comprises data regions for identification, product ownership, behavior, demographics, model scores, and contacts.

43. The system of claim 42, wherein each of the data regions is a database view.

44. The system of claim 42, wherein the data regions comprise a predetermined grouping that is a complete input stream needed to perform a plurality of various customer analytical modeling wherein no additional data is required.

45. The system of claim 25, further comprising:
a creating module configured to create at least one additional variable.

46. The system of claim 25, wherein the customer data extracting module is configured to perform data extracts, transformations, combinations or aggregations against a data warehouse.

47. The system of claim 25, further comprising:
a performing module configured to perform a plurality of queries against the at least one database.

48. A computer program embodied on a computer readable medium for performing insight-driven, adaptive marketing activities, wherein the computer program instructs at least one processor to perform a method comprising:
accessing instructions for a plurality of software modules and accessing customer data for a plurality of customers;
wherein the instructions are stored in at least one memory;
wherein the customer data is stored in at least one database and includes data fields comprising identification fields for household information and individual information, behavior fields, demographic fields, contact history fields, analytic model score fields, and ownership fields, the analytic model score fields including a household identifier and an individual identifier to identify individuals in a household for cross-referencing the customers to households and for cross-referencing the individuals to the customer data in other data fields; and
wherein the plurality of software modules comprise a customer data extracting software module, a training software module, a customer selection module, a campaign tracking module, a data individualizing module, and an insight module; and
executing, by the at least one processor, the instructions to perform:
extracting the customer data from the at least one database by the customer data extracting software module;

training an analytic model with the training software module to predict customer behavior and produce predicted customer behavior data from analysis of the extracted customer data;
  the analytic model predicting behavior of each of the customers, the behavior comprising response by the customers to a plurality of marketing offers via a plurality of interaction channels used to communicate the plurality of marketing offers; and
  the analytic model producing a plurality of scores, each of the scores comprising an indicator of a likelihood of response by a selected customer to a selected marketing offer via a selected interaction channel;
  wherein training comprises:
    choosing a sample set of the customers from the customer data;
    segmenting the sample set of the customers;
    describing the segments with lift values, each of the lift values comprising an indicator of a likelihood of response by a selected customer segment to the selected marketing offer;
    scoring all customers based on segments;
    defining a targeted marketing campaign comprising a targeted marketing offer and a targeted interaction channel;
    building an analytical model; and
    scoring a prospect set with the analytical model, wherein the prospect set comprises all customers in a targeted segment;
selecting a targeted set of the customers from the at least one database by the customer selection module, the selecting based on a determination, from the scores, of customers most likely to respond to the targeted marketing offer via the targeted interaction channel;
executing the targeted marketing campaign with the targeted set of the customers, the targeted marketing offer, and the targeted interaction channel to deliver the targeted marketing offer to the targeted set of customers via the targeted interaction channel;
gathering campaign results data from the targeted marketing campaign by the campaign tracking module, the gathering including
  collecting results data of a count of the customers accepting the targeted marketing offer via the targeted interaction channel, identification information for the customers accepting the targeted marketing offer via the targeted interaction channel, and time statistics related to acceptance of the targeted marketing offer via the targeted interaction channel, wherein the time statistics comprise a length of time between the targeted marketing offer and the acceptance of the targeted marketing offer;
updating the customer data in the at least one database based on the campaign results data, the updating further comprising individualizing, by the data individualizing module, the campaign results data for the customers associated with the campaign results for associating the campaign results data with the individuals for cross-referencing the individuals to the updated customer data in the data fields;
obtaining insight from the campaign results data with the insight module by comparing the predicted customer behavior data to actual customer behavior data produced in response to the targeted marketing campaign; and
repeating extracting, training, selecting, executing, gathering, updating, and obtaining the insight for at least one additional targeted marketing campaign to deliver an additional targeted marketing offer to an additional targeted set of customers via an additional targeted interaction channel in a closed-loop process to obtain additional insight,
  wherein insight obtained from each targeted marketing campaign is used to refine and simplify subsequent customer data extraction, analytic model training, and customer selection, and
  wherein the analytic model is re-trained based on how the customers respond to various types of the marketing offers and to various types of the interaction channels used in each targeted marketing campaign.

49. A computer-implemented method for performing insight-driven, adaptive marketing activities, comprising:
providing a system comprising at least one memory to store instructions, at least one processor having a plurality of software modules, and at least one database embodied on computer-readable medium to store customer data for a plurality of customers,
  wherein the plurality of software modules comprise a customer data extracting software module, a training software module, a customer selection module, a campaign tracking module, a data individualizing module, and an insight module; and
  wherein the software modules access the instructions stored in the at least one memory and the customer data stored in the at least one database; and
executing the instructions by the at least one processor to perform:
  extracting the customer data from the at least one database by the customer data extracting software module;
  training an analytic model with the training software module to predict customer behavior and produce predicted customer behavior data from analysis of the extracted customer data;
    the analytic model predicting behavior of each of the customers, the behavior comprising response by the customers to a plurality of marketing offers via a plurality of interaction channels used to communicate the plurality of marketing offers; and
    the analytic model producing a plurality of scores, each of the scores comprising an indicator of a likelihood of response by a selected customer to a selected marketing offer via a selected interaction channel;
    wherein training comprises:
      choosing a sample set of the customers from the customer data;
      segmenting the sample set of the customers;
      describing the segments with lift values, each of the lift values comprising an indicator of a likelihood of response by a selected customer segment to the selected marketing offer;
      scoring all customers based on segments;
      defining a targeted marketing campaign comprising a targeted marketing offer and a targeted interaction channel;
      building an analytical model; and
      scoring a prospect set with the analytical model, wherein the prospect set comprises all customers in a targeted segment;

selecting a targeted set of the customers from the at least one database by the customer selection module, the selecting based on a determination, from the scores, of customers most likely to respond to the targeted marketing offer via the targeted interaction channel;

executing the targeted marketing campaign with the targeted set of the customers, the targeted marketing offer, and the targeted interaction channel to deliver the targeted marketing offer to the targeted set of customers via the targeted interaction channel;

gathering campaign results data from the targeted marketing campaign by the campaign tracking module, the gathering including collecting results data of a count of the customers accepting the targeted marketing offer via the targeted interaction channel, identification information for the customers accepting the targeted marketing offer via the targeted interaction channel, and time statistics related to acceptance of the targeted marketing offer via the targeted interaction channel, wherein the time statistics comprise a length of time between the targeted marketing offer and the acceptance of the targeted marketing offer;

updating the customer data in the at least one database based on the campaign results data;

obtaining insight from the campaign results data with the insight module by comparing the predicted customer behavior data to actual customer behavior data produced in response to the targeted marketing campaign; and applying the insight to develop at least one additional targeted marketing campaign to deliver an additional targeted marketing offer to an additional targeted set of customers via an additional targeted interaction channel.

50. The computer-implemented method of claim 49, wherein the customer data includes:

data fields comprising identification fields for household information and individual information;

behavior fields;

demographic fields;

contact history fields;

analytic model score fields including a household identifier and an individual identifier to identify individuals in a household for cross-referencing the customers to households and for cross-referencing the individuals to the customer data in other data fields; and ownership fields.

51. The computer-implemented method of claim 49, wherein the updating the customer data further comprises individualizing, by the data individualizing module, the campaign results data for the customers associated with the campaign results for associating the campaign results data with the individuals for cross-referencing the individuals to the updated customer data in the data fields.

52. The computer-implemented method of claim 49, wherein the analytic model is re-trained based on how the customers respond to various types of the marketing offers and to various types of the interaction channels used in each targeted marketing campaign.

53. The computer-implemented method of claim 49, further comprising, in a closed-loop process, obtaining additional insight from results data from the at least one additional targeted marketing campaign, wherein insight obtained from each targeted marketing campaign is used to refine and simplify subsequent customer data extraction, analytic model training, and customer selection.

54. The computer-implemented method of claim 49, further comprising, repeating the extracting, training, selecting, executing, gathering, updating, and obtaining the insight for the at least one additional targeted marketing campaign in a closed-loop process to obtain additional insight, wherein insight obtained from each targeted marketing campaign is used to refine and simplify subsequent customer data extraction, analytic model training, and customer selection.

55. A system, comprising:

at least one processor; and at least one memory storing instructions operable with the at least one processor for executing one or more iterations of insight-driven, adaptive marketing activities in a closed loop process, the instructions structured throughout a plurality of modules, said modules comprising:

a customer data extracting module configured to extract customer data for a plurality of customers from at least one database;

a training module configured to train an analytic model to predict customer behavior and produce predicted customer behavior data from analysis of the extracted customer data;

the analytic model configured to predict behavior of each of the customers, the behavior comprising response by the customers to a plurality of marketing offers via a plurality of interaction channels used to communicate the plurality of marketing offers; and the analytic model configured to produce a plurality of scores, each of the scores comprising an indicator of a likelihood of response by a selected customer to a selected marketing offer and a selected interaction channel;

a choosing module configured to choose a sample set of the customers from the customer data;

a segmenting module configured to segment the sample set of the customers;

a segment description module configured to describe the segments with lift values, each of the lift values comprising an indicator of a likelihood of response by a selected customer segment to the selected marketing offer;

a segment scoring module configured to score all customers based on the segments;

a defining module configured to define a targeted marketing campaign comprising a targeted marketing offer and a targeted interaction channel;

a building module configured to build an analytical model;

a prospect set scoring module configured to score a prospect set with the analytical model, wherein the prospect set comprises all customers in a targeted segment;

a customer selecting module configured to select a targeted set of customers from the at least one database for use in the targeted marketing campaign based on a determination, from the scores, of customers most likely to respond to the targeted marketing offer via the targeted interaction channel;

an execution module configured to execute the targeted marketing campaign with the targeted set of the customers, the targeted marketing offer, and the targeted interaction channel to deliver the targeted marketing offer to the targeted set of customers via the targeted interaction channel;

a gathering module configured to gather campaign results data from the targeted marketing campaign and to collect results data of a count of the customers accepting the targeted marketing offer via the targeted interaction channel, identification information for the customers accepting the targeted marketing offer via the targeted interaction channel, and time statistics related to acceptance of the targeted marketing offer via the targeted interaction channel, wherein the time statistics comprise a length of time between the targeted marketing offer and the acceptance of the targeted marketing offer;

an updating module configured to update the customer data in the at least one database based on the campaign results data;

an insight module configured to obtain insight from the campaign results data for at least one additional targeted marketing campaign by comparing the predicted customer behavior data to actual customer behavior data produced in response to the targeted marketing campaign, wherein the insight is obtained to deliver an additional targeted marketing offer to an additional targeted set of customers via an additional targeted interaction.

56. The system of claim 55, wherein the customer data includes data fields comprising identification fields for household information and individual information, behavior fields, demographic fields, contact history fields, analytic model score fields, and ownership fields, the analytic model score fields including a household identifier and an individual identifier to identify individuals in a household for cross-referencing the customers to households and for cross-referencing the individuals to the customer data in other data fields.

57. The system of claim 55, wherein the updating module further comprises a data individualizing module configured to individualize the campaign results data for the customers associated with the campaign results for associating the campaign results data with the individuals for cross-referencing the individuals to the updated customer data in the data fields.

58. The system of claim 55, further comprising an analysis module configured to analyze the insight obtained from each targeted marketing campaign to refine and simplify subsequent customer data extraction, analytic model training, and customer selection, wherein the analytic model is configured to be re-trained based on how the customers respond to various types of the marketing offers and to various types of the interaction channels used in each targeted marketing campaign.

59. The system of claim 55, wherein additional insight is obtained in a closed-loop process from results data from the at least one additional targeted marketing campaign; and further comprising an analysis module configured to analyze the insight obtained from each targeted marketing campaign to refine and simplify subsequent customer data extraction, analytic model training, and customer selection.

60. The system of claim 55, wherein additional insight is obtained in a closed-loop process by repeating the extracting, training, selecting, executing, gathering, updating, and obtaining the insight for the at least one additional targeted marketing campaign, and further comprising an analysis module configured to analyze the insight obtained from each targeted marketing campaign to refine and simplify subsequent customer data extraction, analytic model training, and customer selection.

61. A computer program embodied on a computer readable medium for performing insight-driven, adaptive marketing activities, wherein the computer program instructs at least one processor to perform a method comprising:

accessing instructions for a plurality of software modules and accessing customer data for a plurality of customers;

wherein the instructions are stored in at least one memory;

wherein the customer data is stored in at least one database; and wherein the plurality of software modules comprise a customer data extracting software module, a training software module, a customer selection module, a campaign tracking module, a data individualizing module, and an insight module; and executing, by the at least one processor, the instructions to perform:

extracting the customer data from the at least one database by the customer data extracting software module;

training an analytic model with the training software module to predict customer behavior and produce predicted customer behavior data from analysis of the extracted customer data;

the analytic model predicting behavior of each of the customers, the behavior comprising response by the customers to a plurality of marketing offers via a plurality of interaction channels used to communicate the plurality of marketing offers; and the analytic model producing a plurality of scores, each of the scores comprising an indicator of a likelihood of response by a selected customer to a selected marketing offer via a selected interaction channel;

wherein training comprises:

choosing a sample set of the customers from the customer data;

segmenting the sample set of the customers;

describing the segments with lift values, each of the lift values comprising an indicator of a likelihood of response by a selected customer segment to the selected marketing offer;

scoring all customers based on segments;

defining a targeted marketing campaign comprising a targeted marketing offer and a targeted interaction channel;

building an analytical model; and scoring a prospect set with the analytical model, wherein the prospect set comprises all customers in a targeted segment;

selecting a targeted set of the customers from the at least one database by the customer selection module, the selecting based on a determination, from the scores, of customers most likely to respond to the targeted marketing offer via the targeted interaction channel;

executing the targeted marketing campaign with the targeted set of the customers, the targeted marketing offer, and the targeted interaction channel to deliver the targeted marketing offer to the targeted set of customers via the targeted interaction channel;

gathering campaign results data from the targeted marketing campaign by the campaign tracking module, the gathering including collecting results data of a count of the customers accepting the targeted marketing offer via the targeted interaction channel, identification information for the customers accepting the targeted marketing offer via the targeted interaction channel, and time statistics related to acceptance of the targeted marketing offer via the targeted interaction channel, wherein the time statistics comprise a length of time between the targeted marketing offer and the acceptance of the targeted marketing offer;

updating the customer data in the at least one database based on the campaign results data;

obtaining insight from the campaign results data with the insight module by comparing the predicted customer behavior data to actual customer behavior data produced in response to the targeted marketing campaign; and applying the insight to develop at least one additional targeted marketing campaign to deliver an additional targeted marketing offer to an additional targeted set of customers via an additional targeted interaction channel.

62. The computer program of claim 61, wherein the customer data is stored in at least one database and includes data fields comprising identification fields for household information and individual information, behavior fields, demographic fields, contact history fields, analytic model score fields, and ownership fields, the analytic model score fields including a household identifier and an individual identifier to identify individuals in a household for cross-referencing the customers to households and for cross-referencing the individuals to the customer data in other data fields.

63. The computer program of claim 61, wherein the updating further comprises individualizing, by the data individualizing module, the campaign results data for the customers associated with the campaign results for associating the campaign results data with the individuals for cross-referencing the individuals to the updated customer data in the data fields.

64. The computer program of claim 61, wherein the analytic model is re-trained based on how the customers respond to various types of the marketing offers and to various types of the interaction channels used in each targeted marketing campaign.

65. The computer program of claim 61,
wherein additional insight is obtained in a closed-loop process from results data from the at least one additional targeted marketing campaign; and
wherein insight obtained from each targeted marketing campaign is used to refine and simplify subsequent customer data extraction, analytic model training, and customer selection.

66. The computer program of claim 61,
wherein additional insight is obtained in a closed-loop process by repeating the extracting, training, selecting, executing, gathering, updating, and obtaining the insight for the at least one additional targeted marketing campaign, and
wherein insight obtained from each targeted marketing campaign is used to refine and simplify subsequent customer data extraction, analytic model training, and customer selection.

* * * * *